United States Patent
Nakatsugawa et al.

(10) Patent No.: US 7,136,365 B2
(45) Date of Patent: Nov. 14, 2006

(54) MOBILE NODE ADAPTED ROUTER AND HOME AGENT ROUTER

(75) Inventors: Keiichi Nakatsugawa, Kawasaki (JP); Tsuguo Kato, Kawasaki (JP); Ryuichi Takechi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 801 days.

(21) Appl. No.: 09/918,271

(22) Filed: Jul. 30, 2001

(65) Prior Publication Data

US 2002/0071417 A1    Jun. 13, 2002

(30) Foreign Application Priority Data

Dec. 12, 2000  (JP) .............................. 2000-377628

(51) Int. Cl.
*H04Q 7/00* (2006.01)
(52) U.S. Cl. .................... 370/331; 370/338; 370/401
(58) Field of Classification Search ............... 370/328, 370/338, 352
See application file for complete search history.

(56) References Cited

U.S. PATENT DOCUMENTS 6,501,746 B1 * 12/2002 Leung .................... 370/338
6,842,456 B1 *  1/2005 Chen et al. ............. 370/401

FOREIGN PATENT DOCUMENTS

| JP | 100230684 | 1/1998 |
| JP | 2000004255 | 1/2000 |
| JP | 2000224238 | 8/2000 |
| JP | 2001-168906 | 6/2001 |
| JP | 2002-16636 | 1/2002 |
| JP | 2002-64544 | 2/2002 |
| JP | 2002-176446 | 6/2002 |

OTHER PUBLICATIONS

S. Kent, et al. IP Authentication Header. The Internet Society. Nov. 1998. pp. 1-22.
S. Deering, et al. Internet Protocol, Version 6, (IPv6). The Internet Society. Dec. 1998. pp. 1-39.
C. Perkins. IP Mobility Support. IBM. Oct. 1996. pp. 1-79.
D. Johnson, et al. Mobility Support in IPv6. Rice University. Nov. 17, 2000. pp. 1-110.
Notice of Reasons for Rejection mailed on Jul. 4, 2006.
Seisho Yasukawa. "Route optimization method in a large-scale mobile IP network" Proceedings 2 of the 2000 Communications Society Conference of IEICE, 2000 Communications Society 2-B-6-2, Sep. 7, 2000.
Hiroyuki Ohnishi et al. "A study on the procedure pf route optimization in Mobile IP" Proceedings 2 of the 2000 Communications Society Conference of IEICE, 2000 Communications Society 2-b-6-2, Sep. 7, 2000.
Hiroyuki Ohnishi et al. "Proposed scheme for route optimization on the Mobile IP network" Proceedings of the 2000 IEICE General Conference, 2000- Spring- Communications 2-B-7-166, Mar. 7, 2000.
Hiroyuki Ohnishi et al. "New route optimization method for the Mobile IPv6 Network" Technical Report of IEICE, SSE2000-2-2, Dec. 8, 2000.

* cited by examiner

*Primary Examiner*—Chau Nguyen
*Assistant Examiner*—Christopher Grey
(74) *Attorney, Agent, or Firm*—Katten Muchin Rosenman LLP

(57) ABSTRACT

A mobile node adapted router and home agent router operating by the IPv6 protocol able to shorten the time required for updating the current address of the mobile node and increase the speed of switching of the transfer route and providing a transfer route not passing through a home agent every time for a node not supporting this protocol, provided with a memory unit for storing a current address of a mobile node which the correspondent node should store instead of the correspondent node and a transfer unit for referring to the memory unit when receiving a packet transmitted to the home address of the mobile node, converting it to the current address, and transmitting the packet.

9 Claims, 34 Drawing Sheets

MOBILE TABLE-CN INFORMATION

| ADDRESS OF CN | HOME ADDRESS OF MN | CoA OF MN | REGISTRATION VALID TIME | SECURITY INFORMATION |
|---|---|---|---|---|
| E | A1 | B1 | 300 SECONDS | SA12 |

MOBILE TABLE-HA INFORMATION

| ADDRESS OF HA | SECURITY INFORMATION |
|---|---|
| D | SA3 |

MOBILE TABLE-MN INFORMATION

| HOME ADDRESS OF MN | CoA OF MN | REGISTRATION VALID TIME |
|---|---|---|
| A2 | B2 | 200 SECONDS |

MOBILE TABLE-MN INFORMATION

| HOME ADDRESS OF MN | CoA OF MN | REGISTRATION VALID TIME | SECURITY INFORMATION |
|---|---|---|---|
| A1 | B1 | 300 SECONDS | SA11 |
| A2 | B2 | 200 SECONDS | SA21 |

MOBILE - ROUTER INFORMATION TABLE - TO BE NOTIFIED

| ADDRESS OF ROUTER | SECURITY INFORMATION |
|---|---|
| G | SA3 |

Fig.31

| DESTINATION PREFIX | NEXT HOP ROUTER | NUMBER OF HOP | OUTPUT PORT |
|---|---|---|---|
| NETWORK 1 | HA | 1 | 1 |
| NETWORK 2 | — | 0 | 1 |
| NETWORK 3 | R3 | 1 | 1 |
| NETWORK 4 | R4 | 1 | 1 |
| NETWORK 5 | — | 0 | 2 |
| NETWORK 6 | R1 | 1 | 2 |

Fig.32

| DESTINATION PREFIX | NEXT HOP ROUTER | NUMBER OF HOP | OUTPUT PORT |
|---|---|---|---|
| NETWORK 1 | — | 0 | 1 |
| NETWORK 2 | — | 0 | 2 |
| NETWORK 3 | R3 | 1 | 2 |
| NETWORK 4 | R4 | 1 | 2 |
| NETWORK 5 | R2 | 1 | 2 |
| NETWORK 6 | R2 | 2 | 2 |

Fig.36

P1: DATA PACKET FROM CN TO MN1

| A1 | E | |
|----|---|--|

P2: DATA PACKET FROM CN TO MN2

| A2 | E | |
|----|---|--|

P3: B.U.12 FROM MN1 TO CN

| E | B1 | BU | A1 | | ←AUTHENTICATION |
|---|----|----|----|--|--|

P4: B.U.3 FROM HA TO R2

| G | D | BU | A2 | | B2 |
|---|---|----|----|--|----|

AUTHENTICATION

Fig.40
P5: DATA PACKET FROM CN TO MN1
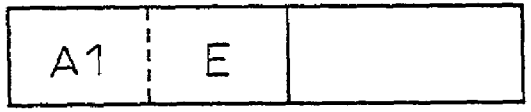
P6: DATA PACKET FROM CN TO MN2 (ENCAPSULATED BY R2)
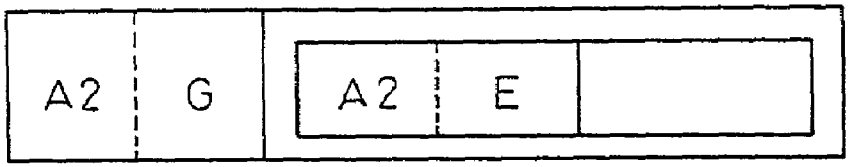
P7: B.U.11 FROM MN1 TO HA
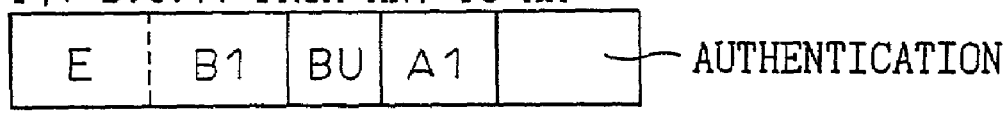
← AUTHENTICATION
P8: B.U.21 FROM MN2 TO HA
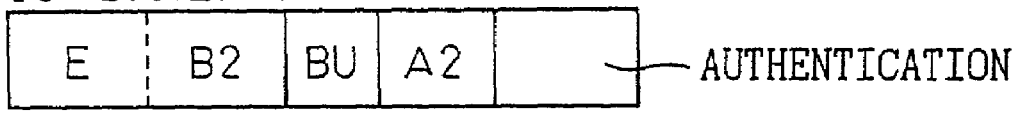
← AUTHENTICATION

MOBILE NODE ADAPTED ROUTER AND HOME AGENT ROUTER

BACKGROUND OF THE INVENTION

1. Field of the Invention

The present invention relates to a mobile node adapted router and a home agent router forming a packet communication system supporting at least mobile nodes among fixed nodes and mobile nodes.

2. Description of the Related Art

As a protocol for mobile nodes enabling communication in an IP network even when nodes change connection points in the network, the Internet Engineering Task Force (IETF) of the U.S. has established the Mobile IP (document [1]: RFC2002) protocol (note: the documents cited in the specification are listed together at the end of the specification).

Due to the rapid rise in the number of nodes serviced by IP networks in recent years, a serious problem has arisen of the depletion of IP addresses. A transition is underway to a network using the IPv6 (document [2]: RFC2460) protocol enabling use of more IP addresses. Therefore, in addition to the Mobile IP protocol in IPv4 networks up to now, effort is being made to establish a Mobile-IPv6 (document [3]) protocol supporting movement of nodes in an IPv6 network. The IETF is engaged in deliberations for the next stage of requests for comments (RFC).

In the Mobile-IPv6 protocol, depending on the configuration of the network or the location of the node, sometimes time is taken for the switching the transfer route when a mobile node (MN) moves. In such a case, there is a problem that if packets are sent from another node to a network connected to before the movement of the mobile node, packet loss occurs and the quality of service deteriorates.

Further, to switch the transfer route, not only the mobile node, but also the correspondent node (CN) communicating with the mobile node has to support the Mobile-IPv6 protocol. Therefore, when the correspondent node does not support the Mobile-IPv6 protocol, the packets to be transmitted to a mobile node are transferred to the mobile node through a home agent router (HA) cooperating with a home link to which the mobile node is normally connected. Therefore, there is a problem of an increase in the transfer delay or concentration of traffic in a home agent router. The above problems will be explained in detail later with reference to the drawings.

SUMMARY OF THE INVENTION

An object of the present invention is to provide, in view of the above problems, a mobile node adapted router and home agent router able to shorten the time required for switching a transfer route and increase the speed of switching of the packet transfer route and, for packet transfer from a correspondent node not supporting the IPv6 protocol to a mobile node, to shorten the transfer route and suppress an increase in the packet loss and transfer delay and the concentration of traffic at a home agent router causing deterioration of the quality of service.

To attain the above object, the mobile node adapted router (10) according to the present invention is provided with a memory means (11) for storing a current address of a mobile node which a correspondent node should store instead of the correspondent node and a transfer means (12) for referring to the memory means (11) when receiving a packet transmitted to the home address of the mobile node, converting it to the current address, and transmitting the packet.

Due to this, a router is realized which can shorten the time required for updating a current address of a mobile node to increase the speed of switching of a transfer route and provide a transfer route for a node not supporting this protocol without going through a home agent router each time.

BRIEF DESCRIPTION OF THE DRAWINGS

These and other objects and features of the present invention will become clearer from the following description of the preferred embodiments given with reference to the attached drawings, wherein:

FIG. 29 is a view of an example of the content of a mobile table for a router (R2) 10;

FIG. 30 is a view of an example of the content of a mobile table for a router (HA) 20;

FIG. 31 is a view of an example of the content of a routing table for a router (R2) 10;

FIG. 32 is a view of an example of the content of a routing table for a router (HA) 20;

FIG. 36 is a view of the format of the packets (P1 to P) in FIG. 35;

FIG. 40 is a view of the format of the packets (P5 to P8) in FIG. 39.

DESCRIPTION OF THE PREFERRED EMBODIMENTS

Preferred embodiments of the present invention will be described in detail below while referring to the attached figures.

Figure 1:
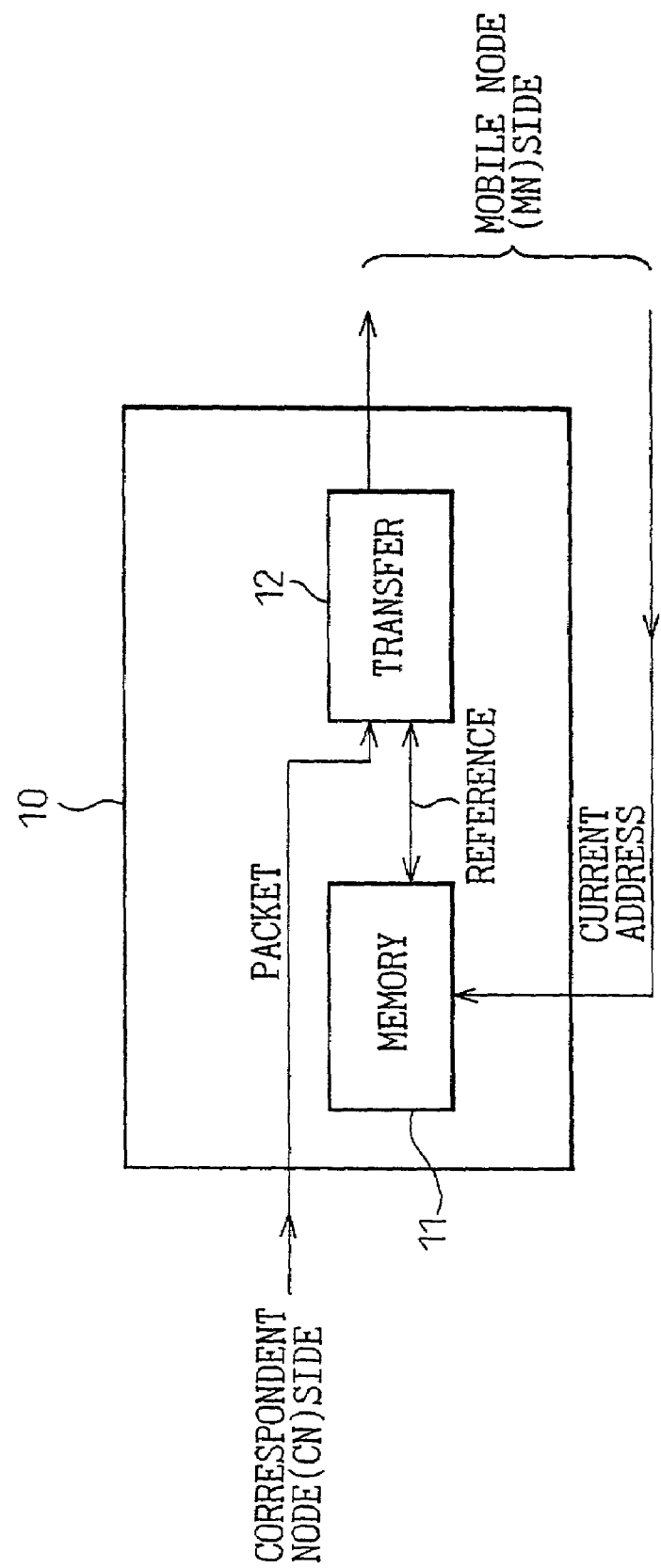
FIG. 1 is a view of the basic configuration of a mobile node adapted router according to the present invention.

FIG. 1 is a view of the basic configuration of a mobile node adapted router according to the present invention. In the figure, the mobile node adapted router 10 according to the present invention is comprised of an illustrated memory means 11 and a transfer means 12. First, the mobile node adapted router 10 is a mobile node adapted router forming a network supporting packet communication of at least mobile nodes. Therefore, this network can also support packet communication of fixed nodes.

Here, the memory means 11 stores the current address of a mobile node which the correspondent node of the packet communication should store instead of the correspondent node.

Further, the transfer means 12 refers to the memory means 11, converts the home address to a current address, and transmits a packet when receiving the packet transmitted from a correspondent node to the home address of the mobile node.

Figure 2:
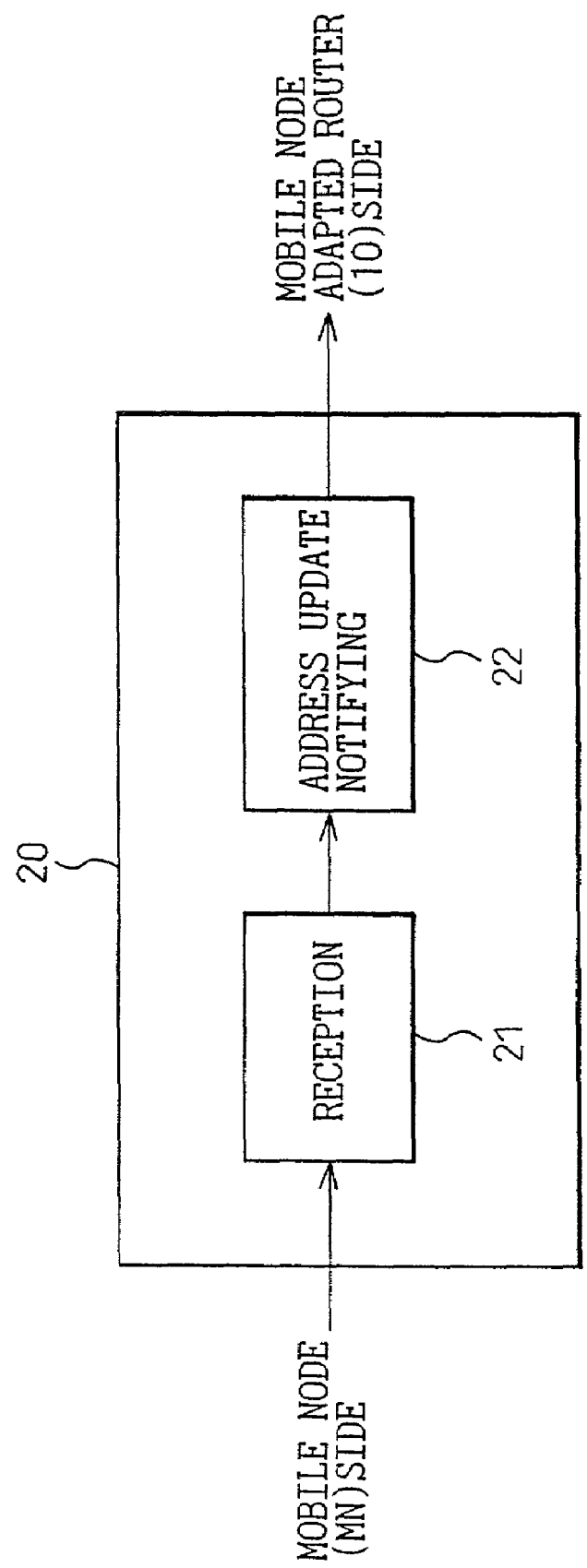
FIG. 2 is a view of the basic configuration of a home agent router according to the present invention.

FIG. 2 is a view of the basic configuration of a home agent router according to the present invention.

The home agent router 20 forms a network supporting communication of at least mobile nodes like the mobile node adapted router 10 of FIG. 1.

Here, the reception means 21 receives update notifying information transmitted for notifying the home agent router of the updating of an address along with a change in a current address due to movement of a mobile node.

Further, the address update notifying means 22 transmits the current address after updating to another router forming part of the network when receiving the update notifying information.

The home agent router 20 has the function of notifying the current address to the memory means 11 based on the present invention in addition to the ordinary functions of a home agent router. The function of notifying the current address is not limited to this (22) (explained later).

Therefore, since the operation for updating the address after movement of the mobile node which the correspondent node supporting the Mobile-IPv6 should inherently perform is performed beforehand by the mobile node adapted router 10 positioned closer than the correspondent node first, the time required for switching the transfer route is shortened and therefore the problematic packet loss is greatly reduced.

Further, the conventional routine where a packet transmitted from a correspondent node not supporting Mobile-IPv6 to a mobile node passes through the mobile node adapted router 10 to the home agent router where the address is rewritten to the current address of the mobile node and sent to the destination mobile node becomes unnecessary and thus the packet is sent directly from the mobile node adapted router 10 to the destination mobile node without going through the home agent router. Therefore the problems of packet transfer delay and concentration of traffic at the home agent router are greatly alleviated.

The present invention can be applied not only to cases supporting the Mobile-IPv6 protocol, but also cases supporting protocols corresponding to the Mobile-IPv6 protocol. Here, however, the explanation will be made taking as an example supporting the current Mobile-IPv6 protocol mainly.

Therefore, first, before explaining embodiments of the present invention, an explanation will be given of a mobile node adapted router 10 of the related art for facilitating understanding of the present invention. Further, an explanation will be given of a home agent of the related art corresponding to the above home agent router 20.

Figure 3:
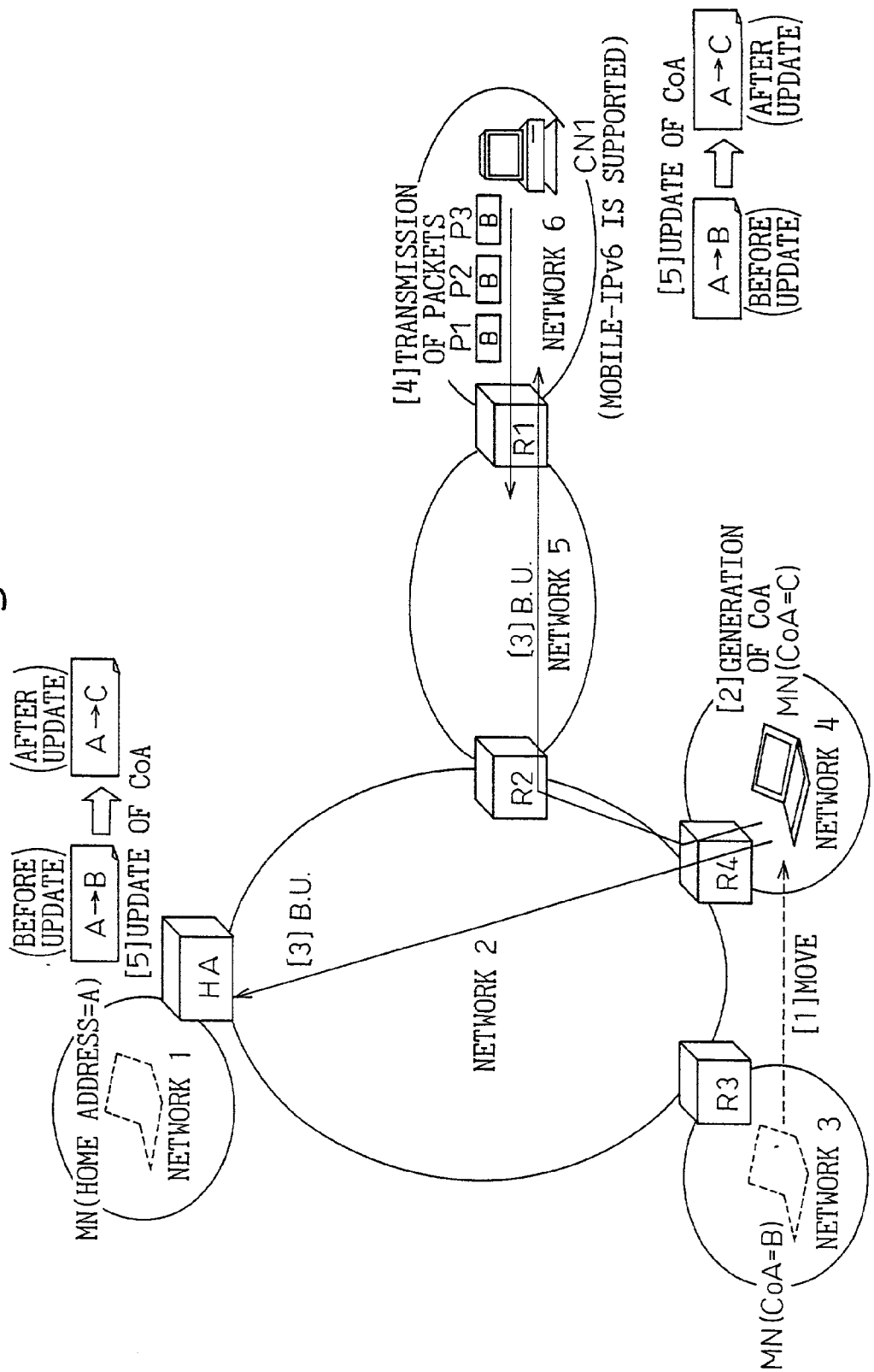
FIG. 3 is a first part of view of a packet communication system of the related art.
Figure 4:
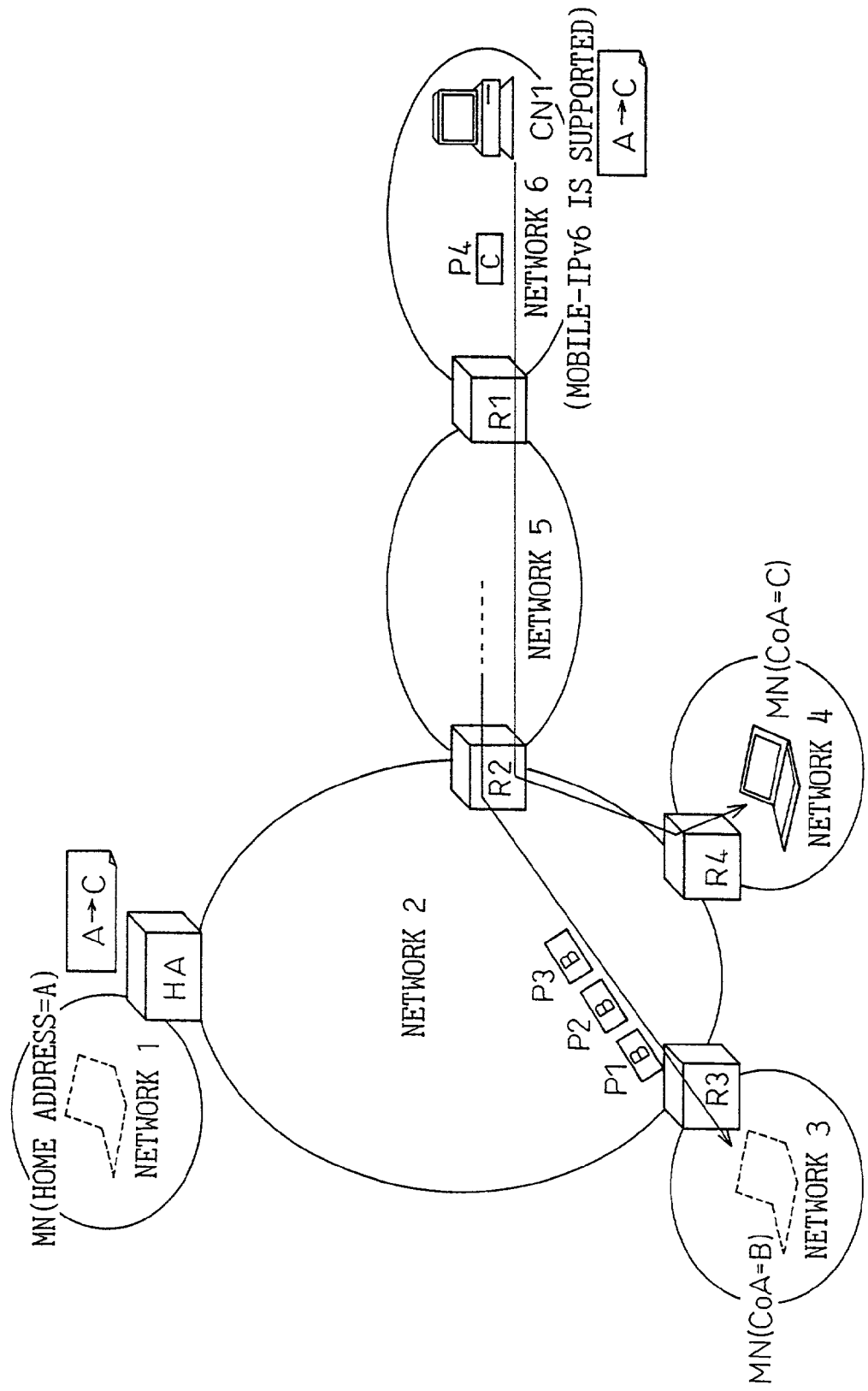
FIG. 4 is a second part of view of a packet communication system of the related art.

FIG. 3 is a first part of a view of a packet communication system of the related art, while FIG. 4 is a second part of the view. Note that FIG. 3 and FIG. 4 show an example of the case of a correspondent node supporting the Mobile-IPv6 protocol.

First, referring to FIG. 3, the invention is predicated on a mobile node (home address=A) normally connected to a home link network 1 moving to a network 3. In this case, the mobile node generates a new address B. This generated address B is notified as a "care-of" address (CoA) to the home agent router and correspondent node CN1 through a not shown route. The home agent router and correspondent node CN1 generate a binding cache (information storing home address of mobile node and CoA of notified mobile node and its validity etc.: defined in document [3]) based on this notification. Note that the correspondent node CN1 is a node supporting the Mobile-IPv6 protocol as explained above. That is, it is a node having the ability to receive and process a binding update (BU) and generate a binding cache.

From this state,

Step [1]: Assume that the mobile node has moved to the network 4.

Step [2]: The mobile node generates an address C as the new CoA in the network 4.

Step [3]: The mobile node sends a binding update (packet notifying CoA: defined in document [3]) to the home agent router and the correspondent node CN1 as the binding update (BU) in the figure to notify them of the CoA (=address C).

Step [4]: Assume that before the binding update (BU) transmitted at step [3] is received by the correspondent node CN1, the packets P1, P2, and P3 are transmitted from the correspondent node CN1 to the mobile node. At this time, the destination address of the packets, that is, the CoA, remains as B.

Step [5]: The home agent router and the correspondent node CN1 receive the binding update (BU) transmitted from the mobile node at step [3] and update the CoA of the mobile node stored as the binding cache from the address B to the address C (A→B, A→C in the figure). Next, the home agent router and the correspondent node CN1 transmit a binding acknowledgment (packet for notifying acknowledgment of reception of binding update, defined in document [3]) over a not shown route to the mobile node.

Next, refer to FIG. 4.

At step [4] of FIG. 3, the packets P1, P2, and P3 sent from the correspondent node CN1 are transmitted to the CoA (=address B) of the network 3 before movement of the mobile node MN. Therefore, they are not received at the mobile node after movement and become packet loss. The packet P4 transmitted from the correspondent node CN1 after updating of the CoA, however, is transmitted to the CoA (=address C) after movement to the network 4 and is received at the mobile node through the router R1→R2→R4.

In this example, there are two networks 5 and 6 between the mobile node and correspondent node CN1. When going through more networks, however, the time required from when a binding update (BU) is transmitted from the mobile node to when this is received by the correspondent node CN1 and the CoA is updated (in the above example, steps [3] to [5] of FIG. 3) can be expected to become much longer. In such a case, as shown by step [4] of FIG. 3, the correspondent node CN1 ends up transferring a large number of packets to the CoA (=address B) of before the movement of the mobile node—resulting in the possibility of a greater packet loss.

Figure 5:
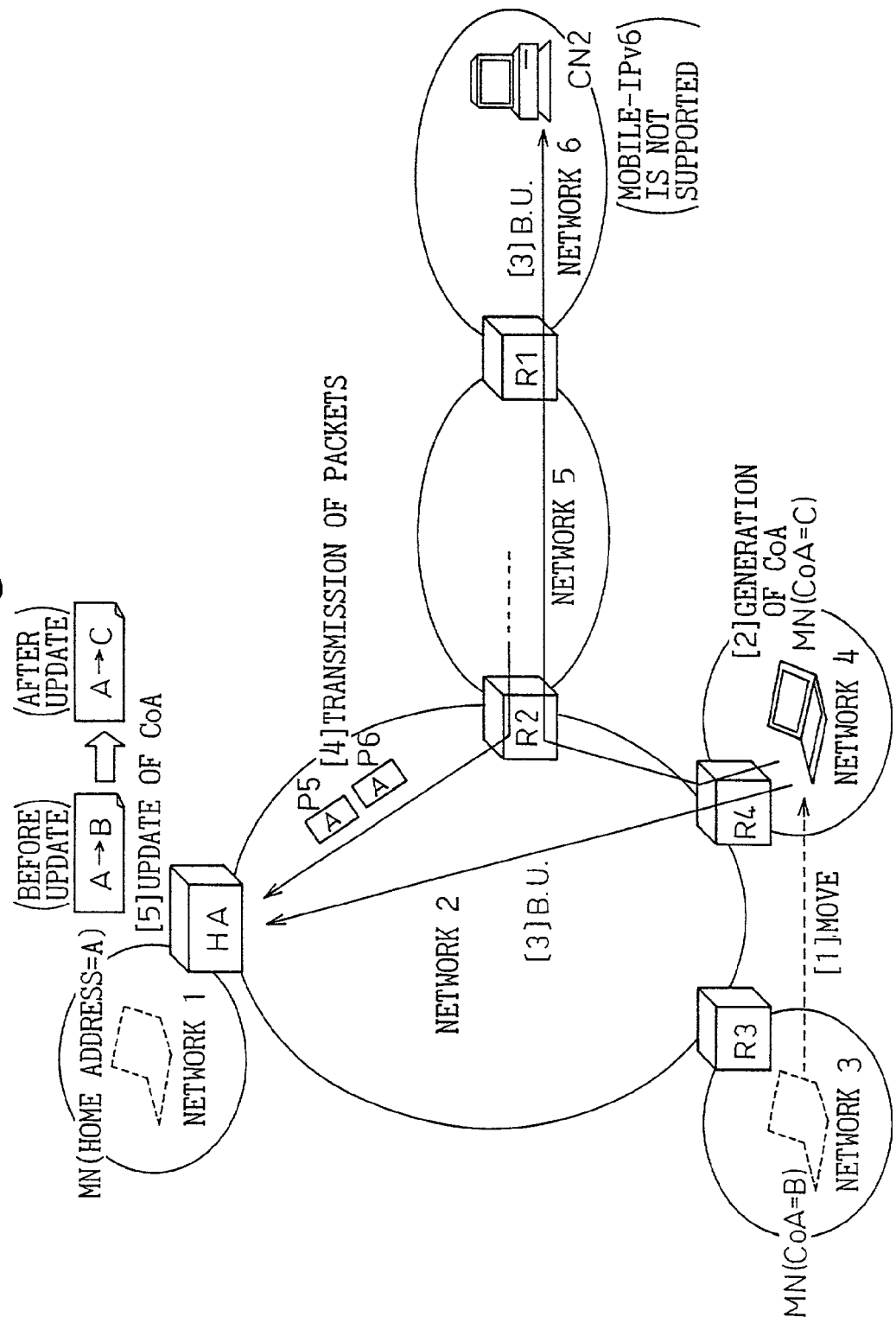
FIG. 5 is a first part of view of another packet communication system of the related art.
Figure 6:
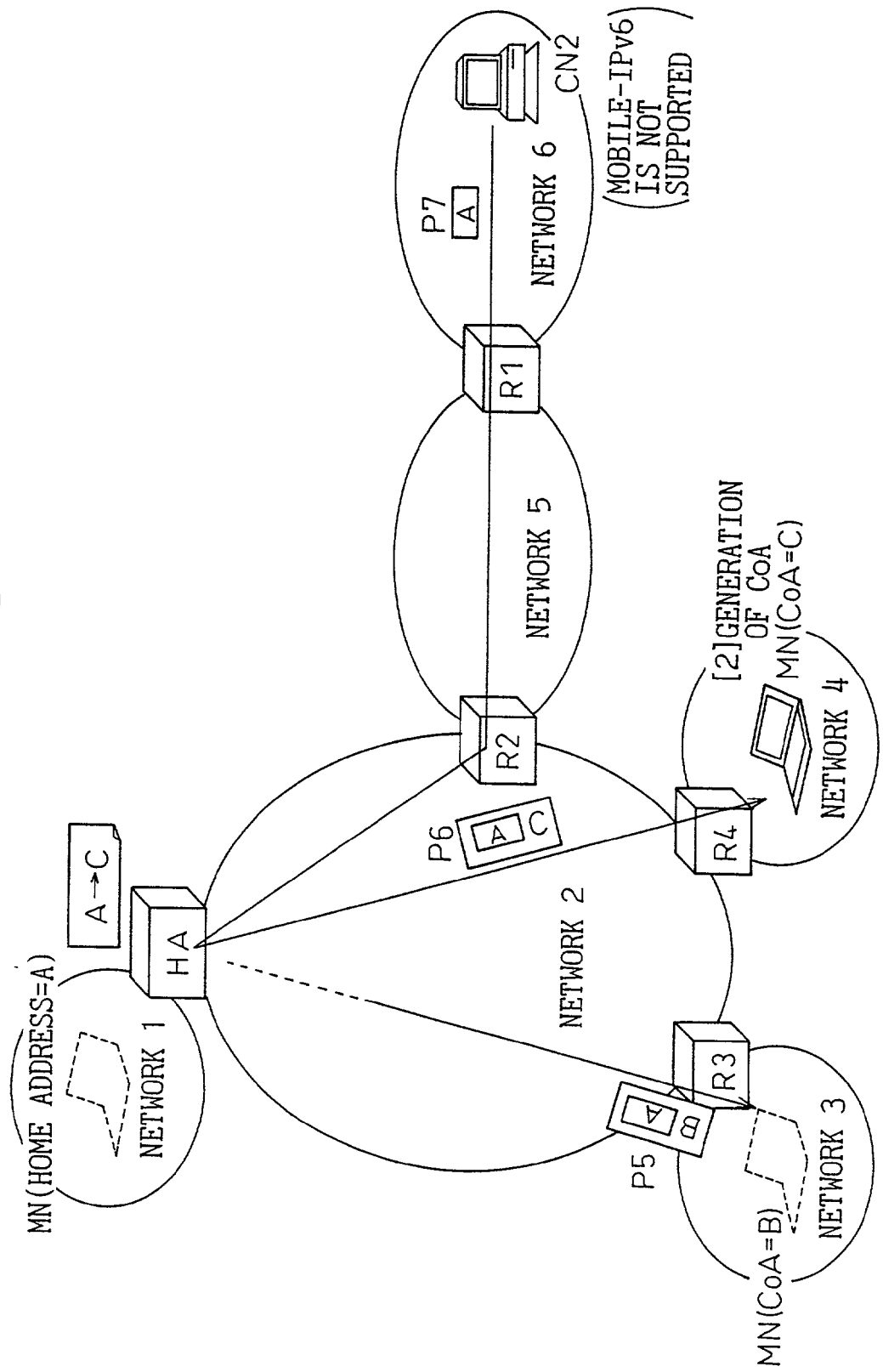
FIG. 6 is a second part of view of another packet communication system of the related art.

FIG. 5 is a first part of a view of another packet communication system of the related art, while FIG. 6 is a second part of the same. Note that FIG. 5 and FIG. 6 show an example of the case where the correspondent node does not support the Mobile-IPv6 protocol.

First, referring to FIG. 5, assume that a mobile node (home address=A) normally connected to the home link network 1 moves to the network 3. In this case, a new address B is generated in the network 3. This generated address B is notified to the home agent router and correspondent node CN2 as the CoA. Due to this notification, the home agent router generates a binding cache, but the correspondent node CN2 does not support the Mobile-IPv6, so does not generate a binding cache, that is, does not store the notified CoA (=address B).

From this state,

Step [1]: Assume that the mobile node has moved to the network 4.

Step [2]: The mobile node generates an address C as a new CoA in the network 4.

Step [3]: The mobile node transmits a binding update to the home agent router and correspondent node CN2 as shown by "BU" in the figure to notify them of the CoA (=address C). Whether or not the correspondent node (CN1/CN2) supports the Mobile-IPv6, the mobile node sometimes transmits a binding update to the correspondent node (CN1/CN2).

Step [4]: The packets P5 and P6 transmitted from the correspondent node CN2 to the home address (=A) of the mobile node are transferred in the network 2. A correspondent node not supporting Mobile-IPv6 transmits the packets to the home address A of the mobile node at all times.

Step [5]: At step [3], the home agent router and correspondent node CN2 receive the binding update (BU) transmitted from the mobile node. The home agent router stores this as the binding cache. The CoA for the mobile node is updated from B to C (in the figure, A→B, A→C). The correspondent node CN2, however, does not support the Mobile-IPv6 protocol, so it is not possible to process the received binding update. That is, the correspondent node CN2 does not store the CoA (=address C) of the mobile node MN.

Note that the home agent router receiving the binding update returns a binding acknowledgment to the mobile node MN by a not shown route.

Next, refer to FIG. 6.

At step [4] of FIG. 5, the packets P5 and P6 transferred to the home address (=A) of the mobile node are intercepted by the home agent router. That is, at the home agent router, the packets are IP-in-IP encapsulated (P6 of the figure) and are tunneled to the CoA (=address C) of the mobile node.

Here, the packet P5 is tunneled to the CoA before updating (=address B), so is not received at the mobile node and therefore becomes packet loss. On the other hand, the packet P6 is tunneled to the CoA after updating (=address C) and therefore is received at the mobile node. After this, the packet P7 transmitted from the correspondent node CN2 to the home address A of the mobile node is received by the mobile node through the routers R1→R2→HA→R4. That is, the packets transmitted from a correspondent node not supporting Mobile-IPv6 are always transferred through the home agent router to the mobile node when the receiving mobile node is moving from the home link to an outside link. This causes an increase in the transfer delay of packets, a concentration of the packet traffic in the home agent router, etc. Further, when the mobile node and home agent router are far apart, it takes time to update the CoA in the home agent router in the same way as the case shown in FIG. 3 and FIG. 4, so the packets end up tunneling from the home agent router to the CoA (=address B) before movement of the mobile node and cause packet loss.

An embodiment of the present invention for solving these problems will be explained in detail below.

The embodiment according to the present invention shortens the time required for updating the CoA of the mobile node and increases the speed of switching of the packet transfer route. Further, it optimizes the packet transfer route from a correspondent node not supporting Mobile-IPv6 to a mobile node so as not to go through the home agent router each time. Due to this, it becomes possible to prevent an increase in the packet transfer delay and packet loss causing deterioration of the quality of service.

Figure 7:
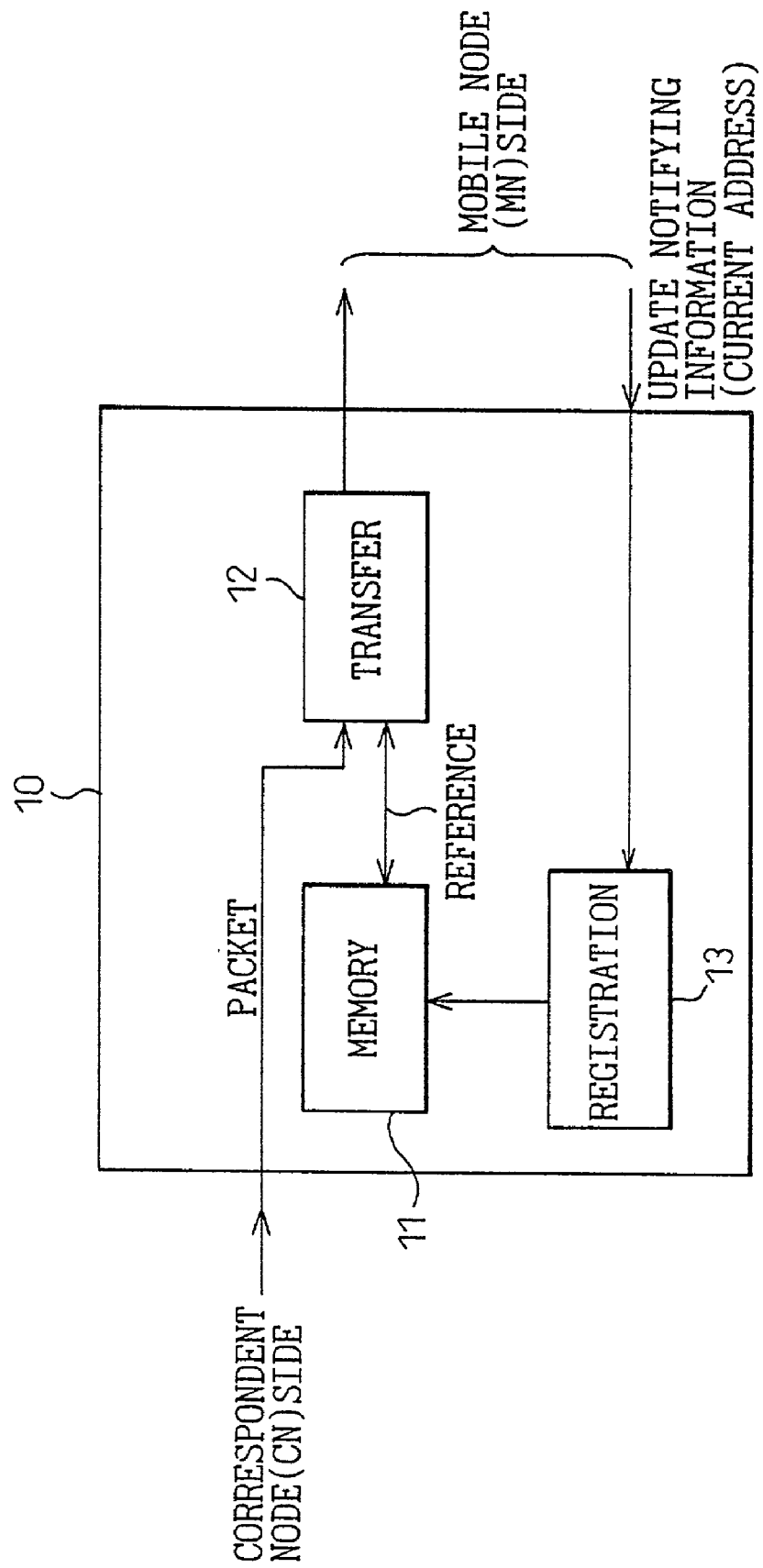
FIG. 7 is a more specific view of the configuration of a mobile node adapted router 10 according to the present invention.

FIG. 7 is a more specific view of the configuration of the mobile node adapted router 10 according to the present invention.

This configuration consists of the configuration of FIG. 1 plus a registering means 13.

The registering means 13 newly registers the correspondence between the home address and the current address in the memory means 11 triggered by the reception of update notifying information transmitted for notifying the correspondent node in communication of updating of an address along with a change of the current address due to movement of the mobile node.

Figure 8:
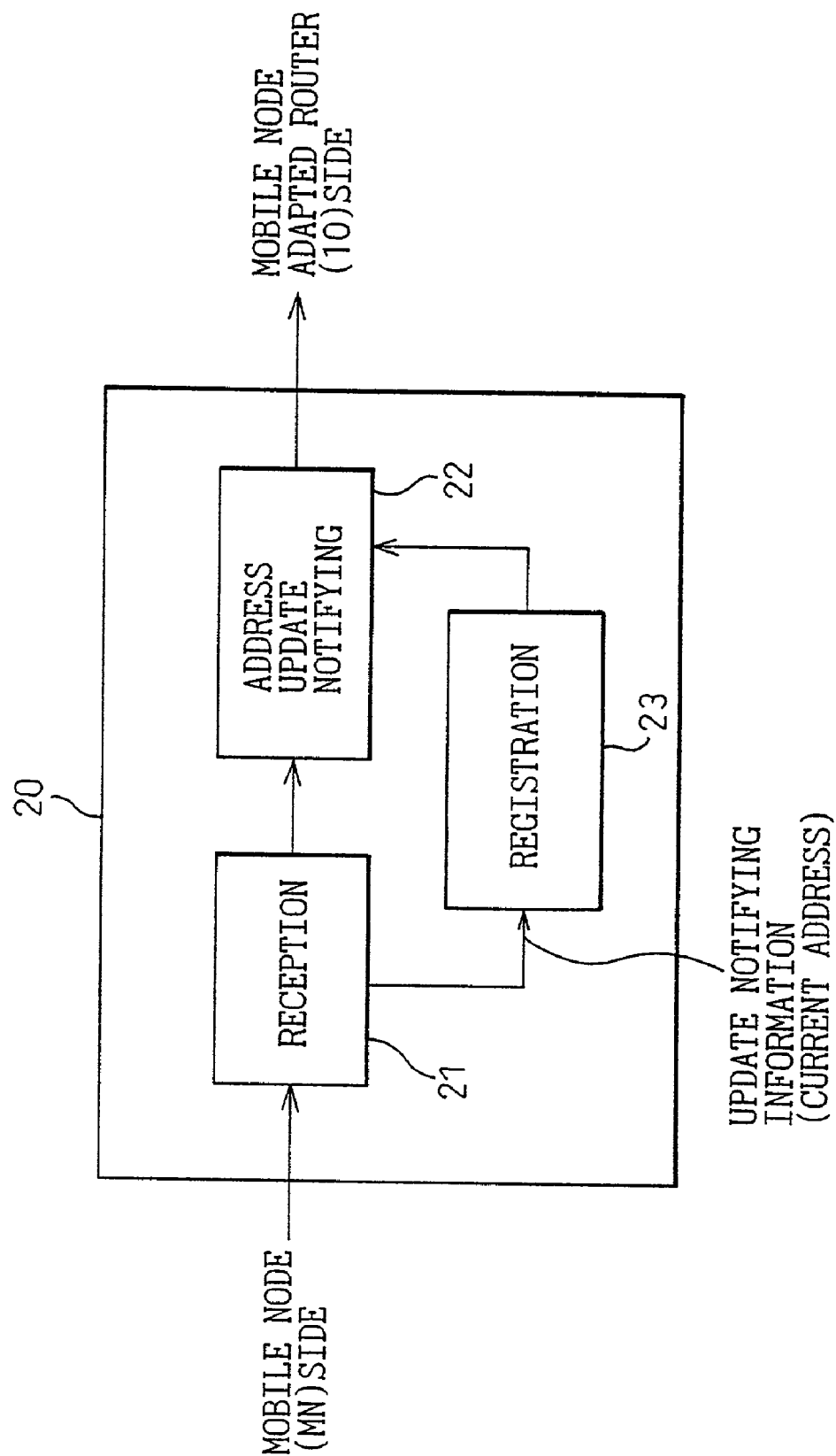
FIG. 8 is a more specific view of the configuration of a home agent router 20 according to the present invention.

FIG. 8 is a more specific view of the configuration of the home agent router 20 according to the present invention.

This configuration consists of the configuration of FIG. 2 plus the registering means 23.

The network 2 includes a home agent router 20 for accommodating a mobile node at its home address.

The registering means 23 newly registers the correspondence between the home address and the current address in the memory means 11 triggered by the transfer of an updated address from the home address router 20 when receiving update notifying information transmitted for notifying the home agent router 20 of updating of an address along with a change of the current address due to movement of the mobile node.

Figure 9:
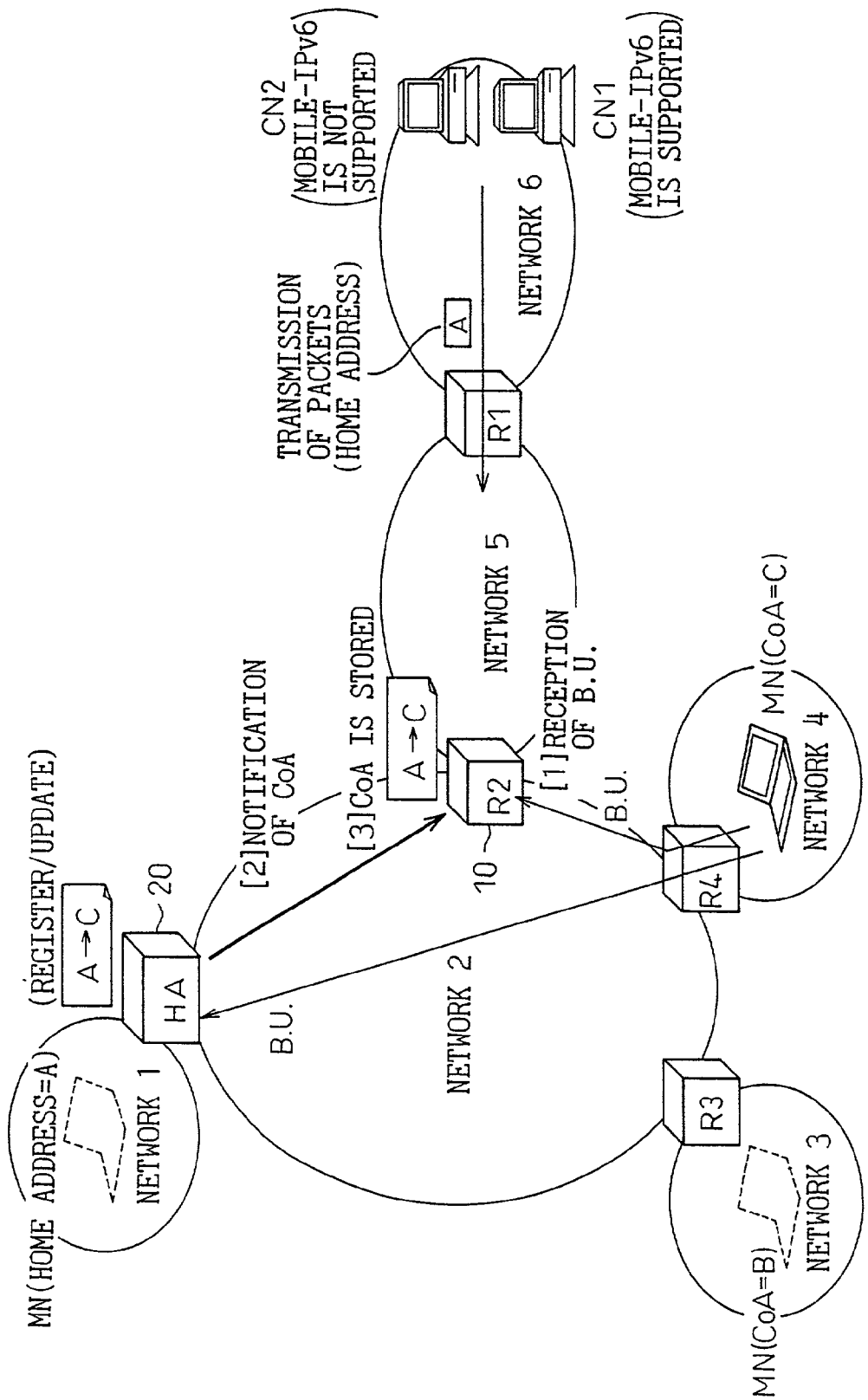
FIG. 9 is a first part of a view of a concrete example of a packet communication system including routers 10 and 20 according to the present invention.
Figure 10:
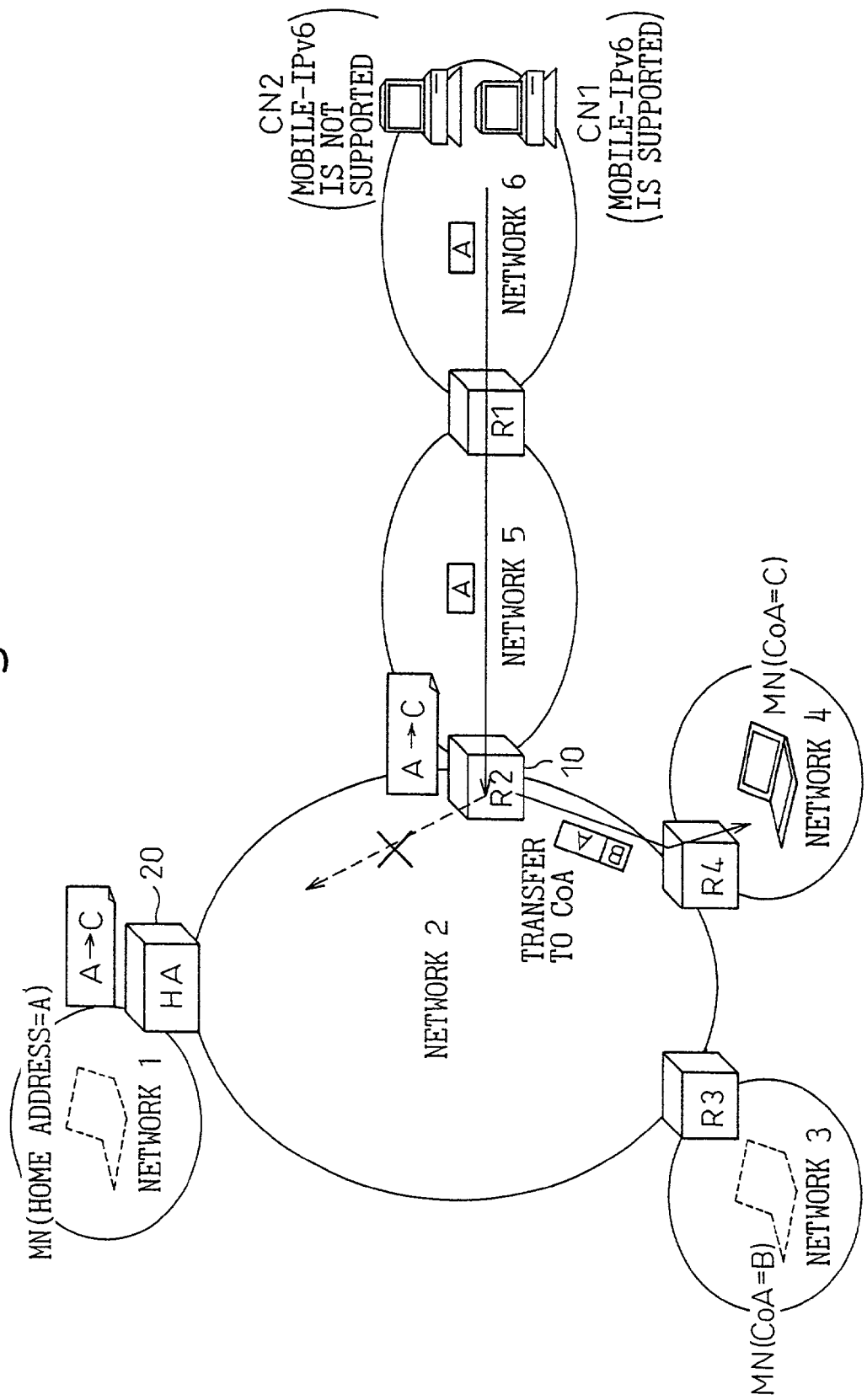
FIG. 10 is a second part of a view of a concrete example of a packet communication system including routers 10 and 20 according to the present invention.

FIG. 9 is a first part of a view of a concrete example of a packet communication system including routers 10 and 20 according to the present invention; while FIG. 10 is a second part of the view of the same.

First, referring to FIG. 9, reference numerals 10 and 20 in the figure represent a mobile node adapted router (R2 in the figure) and a home agent router (HA in the figure) according to the present invention.

The mobile node adapted router R2 receives a binding update (BU) transmitted from the mobile node instead of the correspondent node CN1 or CN2 (step [1] in the figure). Alternately, the home agent router notifies the mobile node adapted router R2 of the updating of the address, while the mobile node adapted router R2 receives this (step [2] in the figure). Due to step [1] or [2], the COA (current address) for the mobile node is stored (step [3] in the figure).

Among the correspondent nodes, the correspondent node CN1 supports Mobile-IPv6. The binding update from the mobile node is received at the mobile node adapted router R2 and does not reach the correspondent node CN1. Therefore, the correspondent node CN1 does not know that the mobile node is moving outside of the home link. Therefore, not only the correspondent node CN2 not supporting Mobile-IPv6, but also the correspondent node CN1 transmits a packet to the home address (=address A) of the mobile node.

In this case, to transmit the binding update (BU) from the mobile node to the home agent router HA and the correspondent node CN (CN1/CN2) and transmit the binding acknowledgment from the home agent router or correspondent node to the mobile node, it is necessary to establish authentication information by an authentication header (document [4] RFC2402) between the mobile node and home agent router and between the mobile node and correspondent node. This information is comprised of a security parameter index, authentication algorithm, authentication key, etc.

When there is no such authentication information, no binding update is transmitted from the mobile node, so the router R2 of the figure cannot update the CoA from the binding update of step [1]. In this case, as shown at step [2] of the figure, it is effective to notify the CoA of the mobile node from the home agent router HA to the mobile node adapted router R2. Note that notification of the CoA from the home agent router HA to the mobile node adapted router R2 is not defined in the Mobile-IPv6 protocol.

Next, referring to FIG. 10, the mobile node adapted router R2 in the figure stores the CoA (=address C) of the mobile node, so when the mobile node adapted router R2 receives a packet transmitted from the correspondent node CN1 or CN2 (addressed to the home address A of the mobile node), the mobile node adapted router R2 does not transfer the packet to the home address A of the mobile node, but can transfer the packet directly toward the CoA (=address C) of the mobile node.

In this way, the router 10 of the present invention (or the router 10 and router 20) can shorten the time required for updating the CoA of the mobile node and increase the speed of switching of the packet transfer route to the mobile node. Further, when there is a transmission of a packet from the correspondent node CN2 not supporting Mobile-IPv6 to a mobile node, the transfer route is optimized so as not to go through the home agent router each time. Due to this, it becomes possible to prevent an increase in the packet transfer delay or packet loss causing deterioration of the quality of service.

Next, more detailed examples of FIG. 9 and FIG. 10 will be explained.

Figure 11:
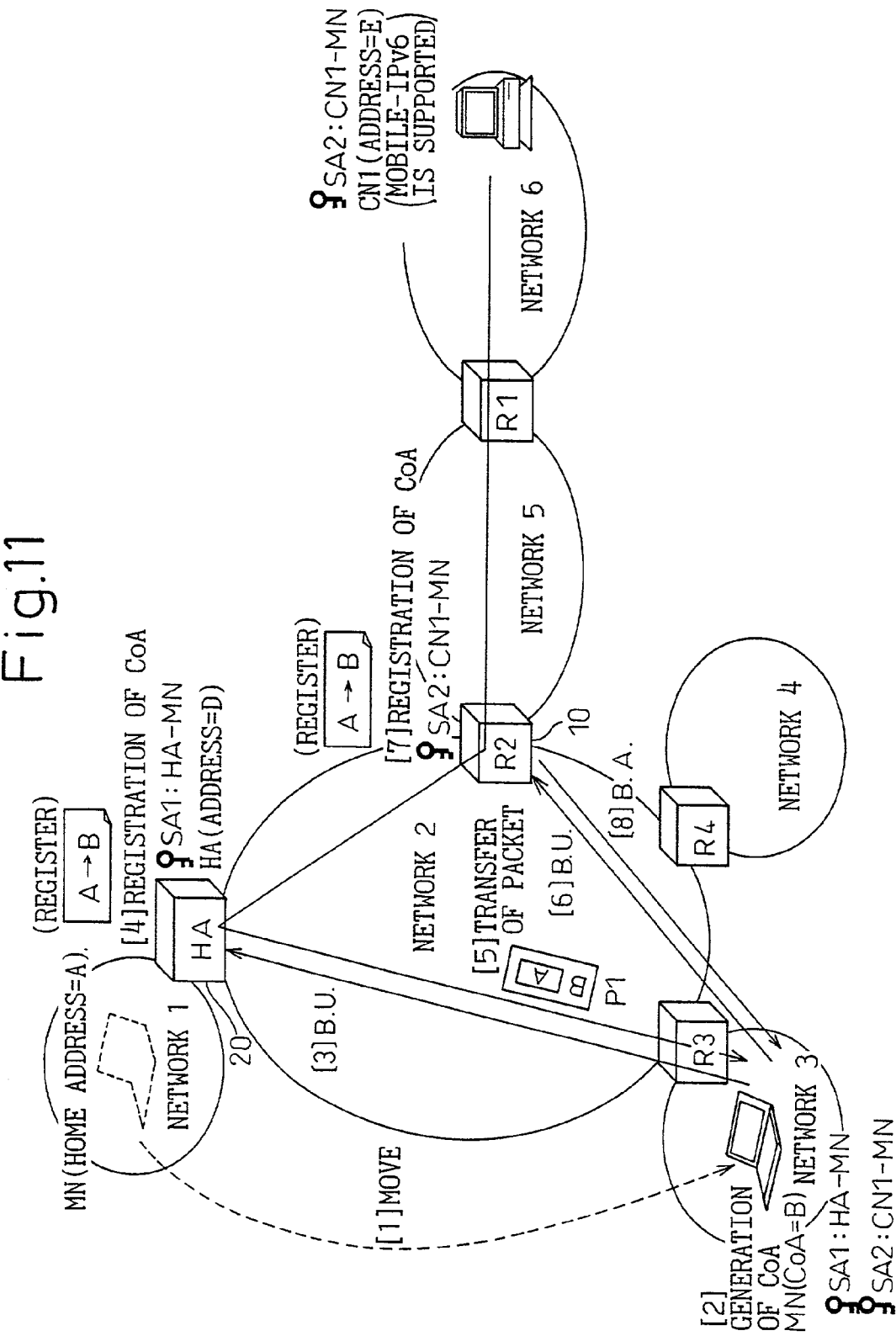
FIG. 11 is a first part of a view of a first detailed example of the system of FIG. 9 and FIG. 10.
Figure 12:
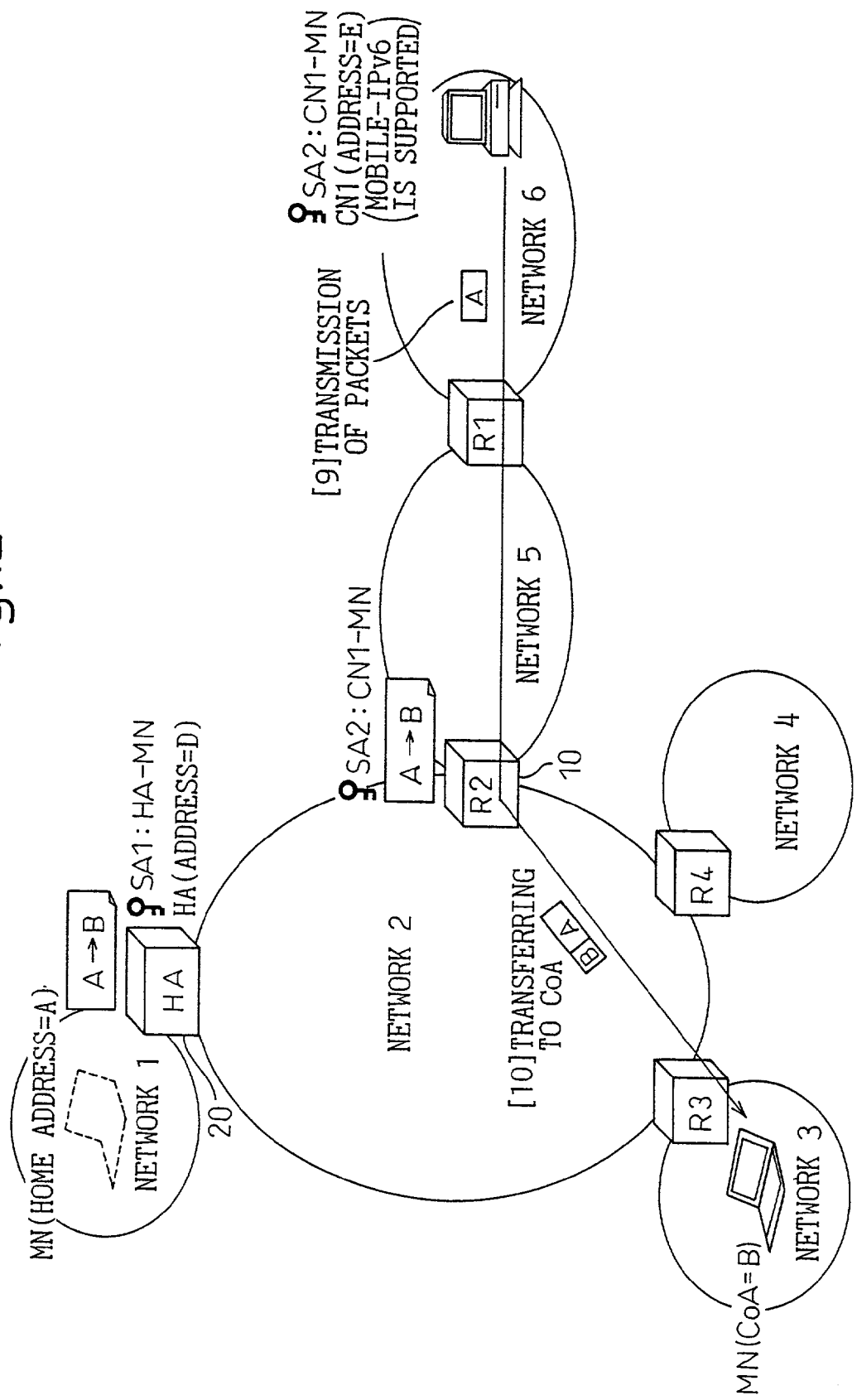
FIG. 12 is a second part of a view of a first detailed example of the system of FIG. 9 and FIG. 10.

FIG. 11 is a first part of a view of a first detailed example of the system of FIG. 9 and FIG. 10; while FIG. 12 is a second part of the view.

First, a detailed explanation will be given of the routers (R1, R2, R3, and R4) and nodes (MN, CN1) shown in FIG. 11 and FIG. 12 upon which the invention is predicated.

<Mobile Node>

The mobile node supports the Mobile-IPv6 protocol. This mobile node is normally connected to the network 1 of the home link of the mobile node and communicates using the home address A. When moving to a network other than the home link (network 1), it generates a CoA (Care-of Address) for use in the network moved to. Further, it transmits a binding update to the home agent router 20 and the correspondent node CN1 by the Mobile-IPv6 protocol. Further, the mobile node is assumed to hold authentication information SA1 with the home agent router 20 and authentication information SA2 with the correspondent node CN1. "SA1" and "SA2" stand for "Security Association 1" and "Security Association 2".

<Home Agent Router>

The home agent router is a router or server providing a home agent service under the Mobile-IPv6 protocol in the network 1 of the home link of the mobile node. In this example, the address of the home agent router 20 is made D. Further, the home agent router 20 is assumed to hold authentication information SA1 with the mobile node.

When the home agent router receives the binding update transmitted from the mobile node, the home agent router generates and holds the binding cache. When generating the binding cache, the home agent router returns a binding acknowledgment (BA) to the mobile node. During the validity of the binding cache, the home agent router intercepts packets transmitted addressed to the mobile node and Ip-in-IP encapsulates and transfers the packets toward the CoA (=address B) of the mobile node.

<Correspondent Node CN1>

The correspondent node CN1 is a node communicating with a mobile node and supporting the Mobile-IPv6 protocol. In this example, the address of the correspondent node CN1 is made E. Further, assume the correspondent node holds the authentication information SA2 with the mobile node.

When receiving a binding update transmitted from the mobile node, in the same way as the home agent router, the correspondent node generates and holds a binding cache. When transmitting a packet to the mobile node during the validity of the binding cache, the correspondent node uses an IPv6 extension header, that is, a routing option header, to directly transfer the packets to the CoA (=address B) of the mobile node. This is however operation in the normal case by the Mobile-IPv6. In the present invention, the router R2 receives the binding update and transfers packets to the CoA (=address B) instead of the correspondent node CN1.

<Routers R1, R3, and R4>

These are ordinary IPv6 routers.

<Router R2>

This is a mobile node adapted router having the above function of the present invention in addition to the functions of an ordinary IPv6 router. In this example, the router is assumed to hold authentication information SA2 with the mobile node in the same way as the correspondent node CN1.

Next, the operation of the system of FIG. 11 will be summarized.

Step [1]: Assume that the mobile node has moved from the network 1 of the home link to the network 3.

Step [2]: The mobile node receives information of the network prefix (fixed code indicating the identity of each network) included in the "router advertisement" broadcast by the router R3 in the network 3, finds that it (mobile node) has moved outside of the network 1, and generates a CoA (here, made the address B).

Step [3]: The mobile node transmits a binding update to the home agent router 20 and notifies the CoA (=address B) as the current address.

Step [4]: The home agent router 20 stores the home address (=A) and CoA (=B) of the mobile node etc. as the binding cache based on the received binding update. Further, it returns a binding acknowledgment to the mobile node by a not shown route.

Step [5]: Here, assume that the correspondent node CN1 transmits a packet to the mobile node. The correspondent node CN1 still does not know that the mobile node is moving toward the network 3, so the packet is transmitted to the home address (=A) of the mobile node. The packet is transferred to the network 1 of the home address (=A) of the mobile node through the router R1→R2. At this time, the home agent router 20 intercepts the packet, IP-in-IP encapsulates it, and transfers it to the moving mobile node. The content of the packet at this time is shown in the figure.

Figure 13:
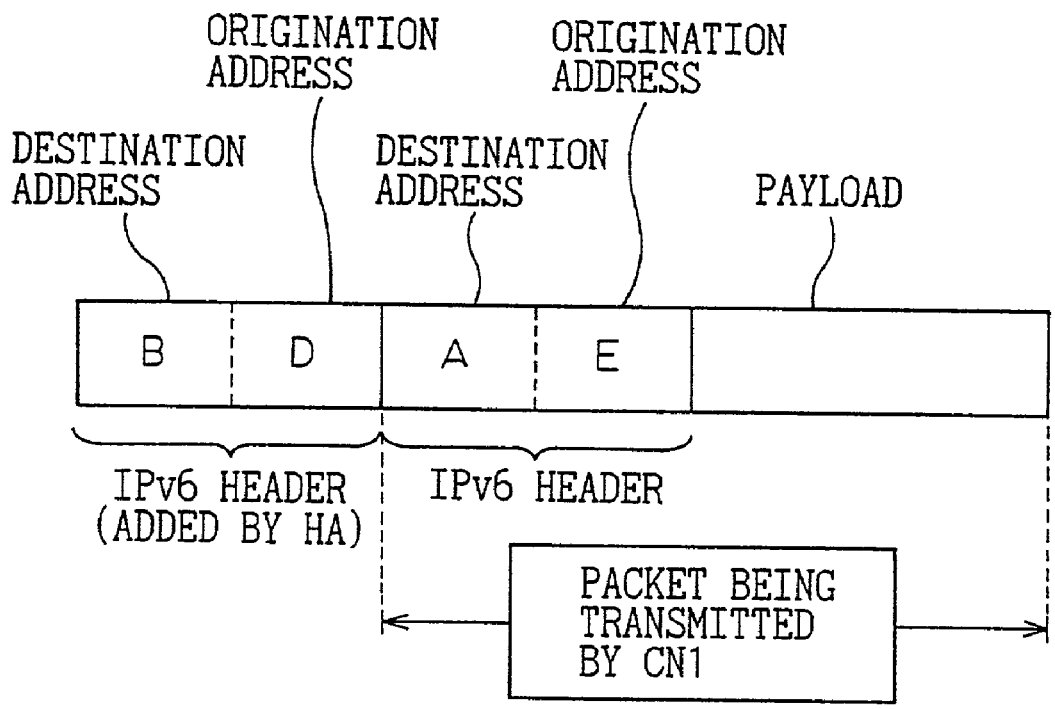
FIG. 13 is a view of the format of a packet transferred at step [5] of FIG. 11.

FIG. 13 is a view of the format of a packet transferred at step [5] in FIG. 11.

In addition to the original packet (destination address=A, origination address=E) transmitted by the correspondent node CN1, another IP header (destination address=B, origination address=D) is added by the home agent router. This is an IP-in-IP encapsulated packet.

Step [6]: The mobile node returns a binding update to the correspondent node CN1 originating the original packet when receiving the above IP-in-IP encapsulated packet from the home agent router 20. The content of the packet at this time is shown in the figure.

Figure 14:
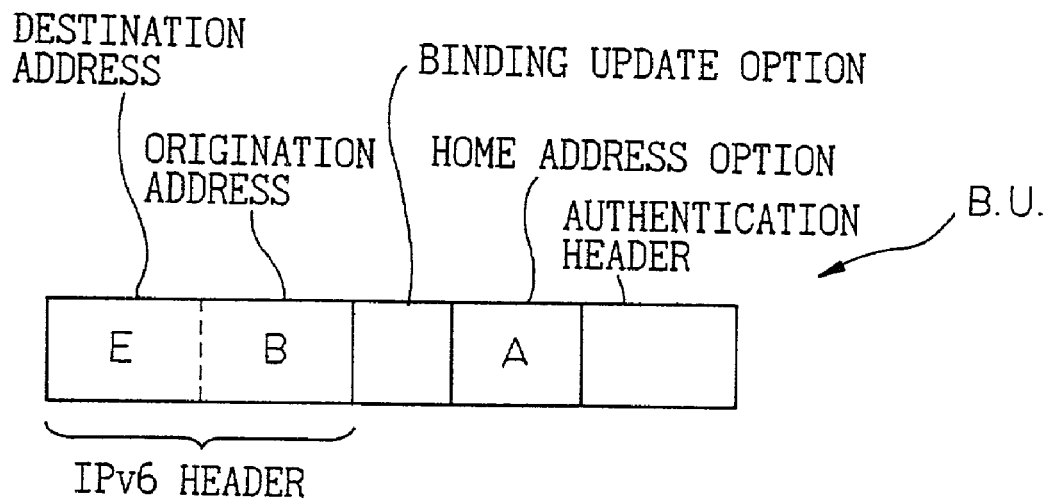
FIG. 14 is a view of the format of a packet transferred at step [6] of FIG. 11.

FIG. 14 is a view of the format of a packet transferred at step [6] in FIG. 11.

The binding update signal becomes a packet of a format comprised of an IPv6 header (destination address=E, origination address=B) plus a binding update option (document [3]), home address option (document [3]), and authentication header (document [4]).

Each of the binding update option and the home address option is defined as one of the IPv6 extension headers (document [2]), that is, destination option headers (document [2]). The values of the option types are C6 (hexadecimal) for the binding update option and C9 (hexadecimal) for the home address option.

Up to step [6], the operation is that of an ordinary operation based on the Mobile-IPv6 protocol.

Step [7]: At step [6], the router (R2) 10 according to the present invention receives the binding update of FIG. 14 transmitted from the mobile node to the correspondent node CN1.

The mobile node adapted router R2 checks the content of the received binding update packet.

First, the router detects by the registering means 13 (FIG. 7) that the binding update option shown in FIG. 14 is included and judges that the packet is a binding update signal of Mobile-IPv6.

Next, since the destination address of the IPv6 header of FIG. 14 is the address (=E) of the correspondent node CN1, it judges that the binding update signal is transmitted to the correspondent node CN1.

Further, the router uses the authentication information SA2 for the correspondent node CN1 to check the authentication header of FIG. 14.

Further, when the check of the authentication header succeeds, the mobile node adapted router R2 generates a binding cache from the home address (=A) of the mobile node obtained from the home address option of FIG. 14 included in the packet, the CoA (=address B) of the mobile node of the origination address of the IPv6 header, the validity included in the binding update option, etc. and stores this in the memory means 11 of the mobile node adapted router R2 (FIG. 7).

Step [8]: In the binding update option included in the packet of step [6], when an acknowledge bit (so-called "A-bit") is set, the mobile node adapted router R2 returns a binding acknowledgment (BA) to the mobile node by the transfer means 12 (FIG. 7). (If the acknowledge (A) bit is not set, it is also possible to not return a binding acknowledgment.) The content of the packet at this time is shown in the figure.

Figure 15:
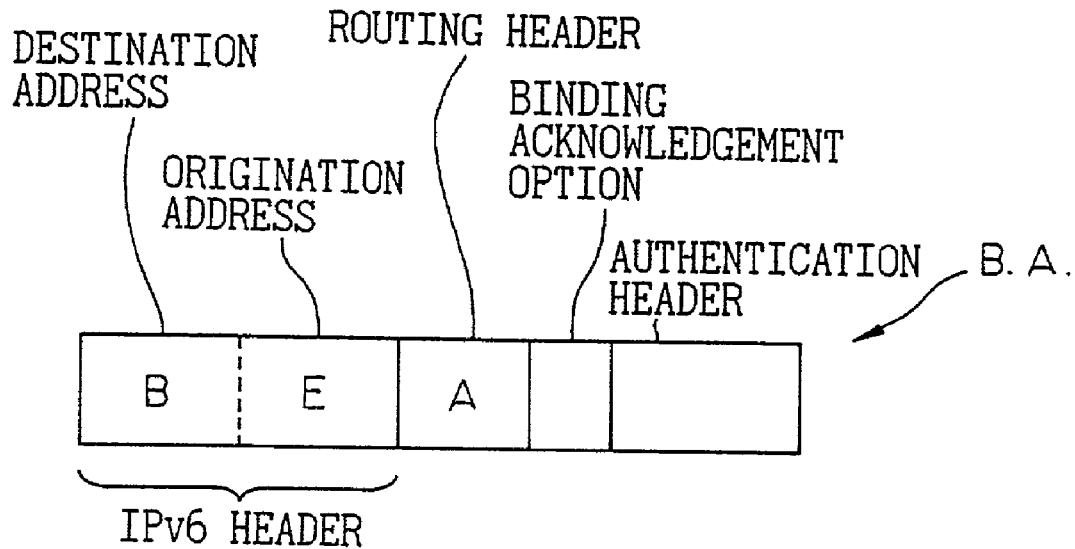
FIG. 15 is a view of the format of a packet transferred at step [8] of FIG. 11.

FIG. 15 is a view of the format of a packet transferred at step [8] in FIG. 11.

The binding acknowledgment (BA), as shown in FIG. 15, is a packet comprised of the IPv6 header (destination address=B, origination address=E) plus a routing header (document [2]) (destination address=A), binding acknowledgment option (document [3]), and authentication header.

The binding acknowledgment option is defined as a destination option header as one of the IPv6 extension headers. The value of the option type is 07 (hexadecimal).

The routing header, like the destination option header, is defined as an IPv6 extension header and determines the destination address of the IPv6 packet during transfer.

The above will be summarized with reference to FIG. 7 next.

When the correspondent node is the correspondent node CN1 supporting the Mobile-IPv6 protocol, the current address of FIG. 7 is the CoA. Further, the update notifying information of FIG. 7 is a binding update signal. These are received instead of the correspondent node CN1.

At this time, the transfer means 12 of FIG. 7 holds the authentication information determined with the mobile node and returns a binding acknowledgment signal for the reception of the binding update signal to the mobile node originating the binding update signal. The router executes these in place of the correspondent node CN1.

Next, refer to the above FIG. 12.

Step [9]: Here, assume that the correspondent node CN1 transmits a packet addressed to the mobile node. At this time, the mobile node adapted router R2 receives and holds the binding update from the mobile node to the correspondent node CN1 at step [7], so the correspondent node CN1 does not know that the mobile node is moving to the network 3. Therefore, the correspondent node CN1 transmits a packet addressed to the home address (=A) of the mobile node as normally.

Step [10]: When the mobile node adapted router R2 receives the packet transmitted at step [9], the transfer means 12 of the mobile node adapted router R2 (FIG. 7) checks the destination address. That is, the mobile node adapted router R2 refers to the memory means 11 (FIG. 7) and, when there is a binding cache for the home address (=A) of the mobile node of the destination address and it is valid, transfers the received packet not to the home address (=A) of the mobile node, but the CoA (=address B). The mobile node adapted router R2 transfers packets to the CoA of the mobile node (=address B) by the following modes (I) and (II):

(I) Transfer by using a routing header, that is, one IPv6 extension header.

(II) Transfer by IP-in-IP encapsulation.

Further, the following processing 1) and 2) may be performed depending on whether the packet transmitted by the correspondent node CN1 includes an authentication header or not.

1) Transfer Using Routing Header

To explain this case, refer to FIG. 16 to FIG. 19 in addition to FIG. 12.

Figure 16:
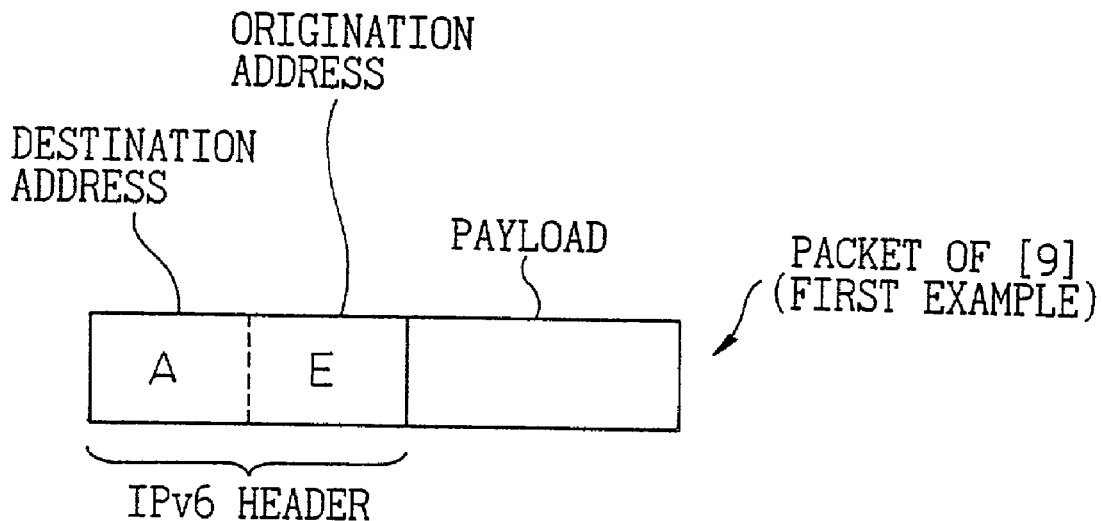
FIG. 16 is a view of the format of a packet transferred at step [9] of FIG. 12 (first example)
Figure 17:
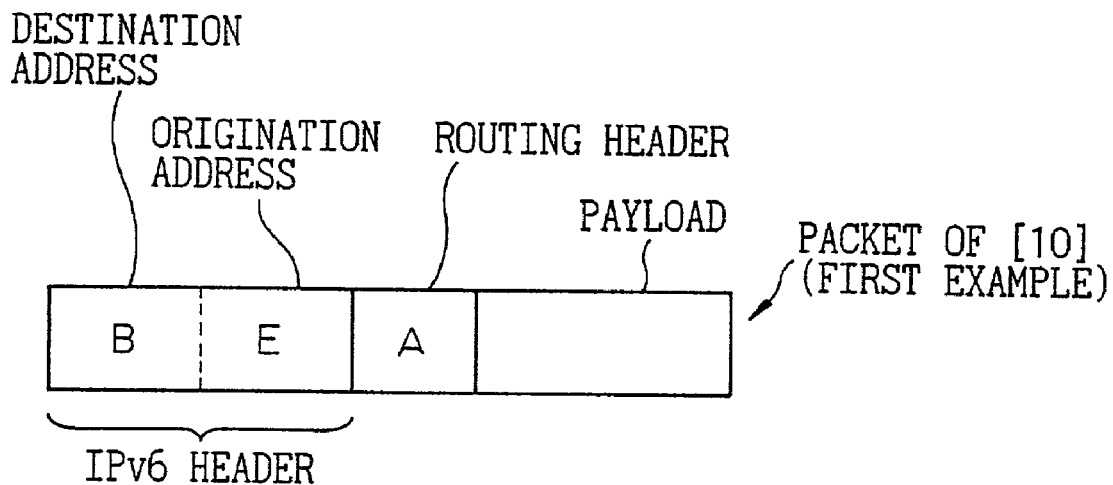
FIG. 17 is a view of the format of a packet transferred at step [10] of FIG. 12 (first example)
Figure 18:
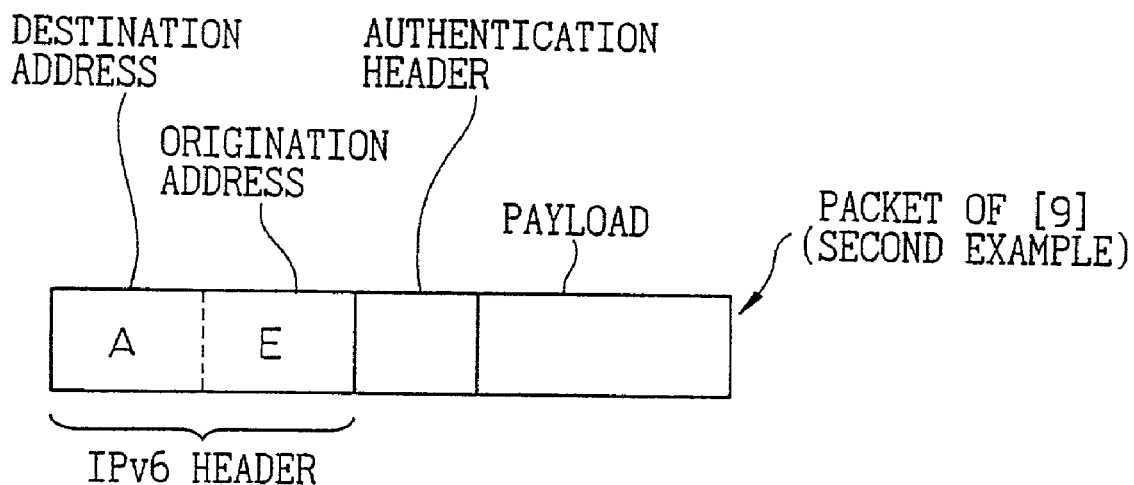
FIG. 18 is a view of the format of a packet transferred at step [9] of FIG. 12 (second example)

FIG. 16 is a view of the format of a packet transferred at step [9] of FIG. 12 (first example); FIG. 17 is a view of the format of a packet transferred at step [10] of FIG. 12 (first example); FIG. 18 is a view of the format of a packet transferred at step [9] of FIG. 12 (second example); and FIG. 19 is a view of the format of a packet transferred at step [10] of FIG. 12 (second example).

Figure 19:
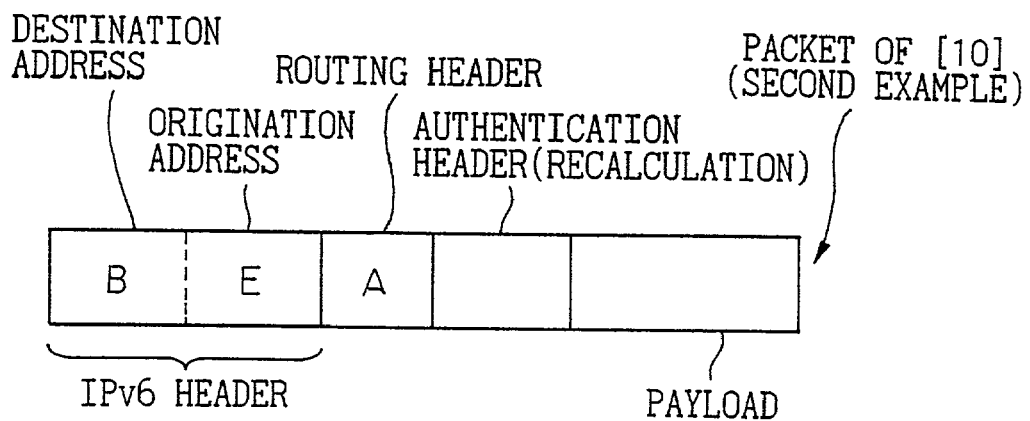
FIG. 19 is a view of the format of a packet transferred at step [10] of FIG. 12 (second example)

In more detail, FIG. 16 shows a packet in the case of no authentication header, FIG. 18 shows a packet in the case of an authentication header, FIG. 17 shows a packet in the case of use of an IPv6 routing header and in the case of no authentication header, and FIG. 19 shows a packet in the case of use of an IPv6 routing header and in the case of an authentication header.

Referring to FIG. 12 and FIG. 16 to FIG. 19, 1-a) when a packet transmitted by the correspondent node CN1 does not include an authentication header such as in FIG. 16, the packet transferred from the transfer means 12 of the mobile node adapted router R2 (FIG. 7) to the COA of the mobile node (=address B) becomes as shown in FIG. 17.

The packet of FIG. 17 is comprised of the IPv6 header (destination address=B, origination address=E) plus a routing header (destination address=A).

1-b) When a packet transmitted by the correspondent node CN1 includes an authentication header such as in FIG. 18, the packet transferred from the transfer means 12 of the mobile node adapted router R2 (FIG. 7) to the CoA of the mobile node (=address B) becomes as shown in FIG. 19. That is, it is comprised of the IPv6 header (destination address=B, origination address=E) plus the routing heading (destination address=A) and the authentication header.

It should be noted here that the authentication header is not added as what is included in FIG. 18 as it is, but is added as what the mobile node adapted router R2 recalculates using the authentication information SA2 between the correspondent node CN1 and the mobile node. The reason is as follows:

The authentication data in the authentication header is normally calculated using just the content of the IP packet. Therefore, the authentication data calculated using the content of the packet of FIG. 18 differs from the authentication data when the content of the packet is changed by the mobile node adapted router R2 such as in FIG. 19. Since the authentication fails, the packet of step [10] ends up being discarded at the receiving node, i.e., the mobile node. Therefore, the mobile node adapted router R2 has to recalculate the authentication data using the content of the changed packet of FIG. 19. This is the meaning of the authentication header (recalculation) in FIG. 19.

2) Transfer by IP-in-IP Encapsulation

Figure 20:
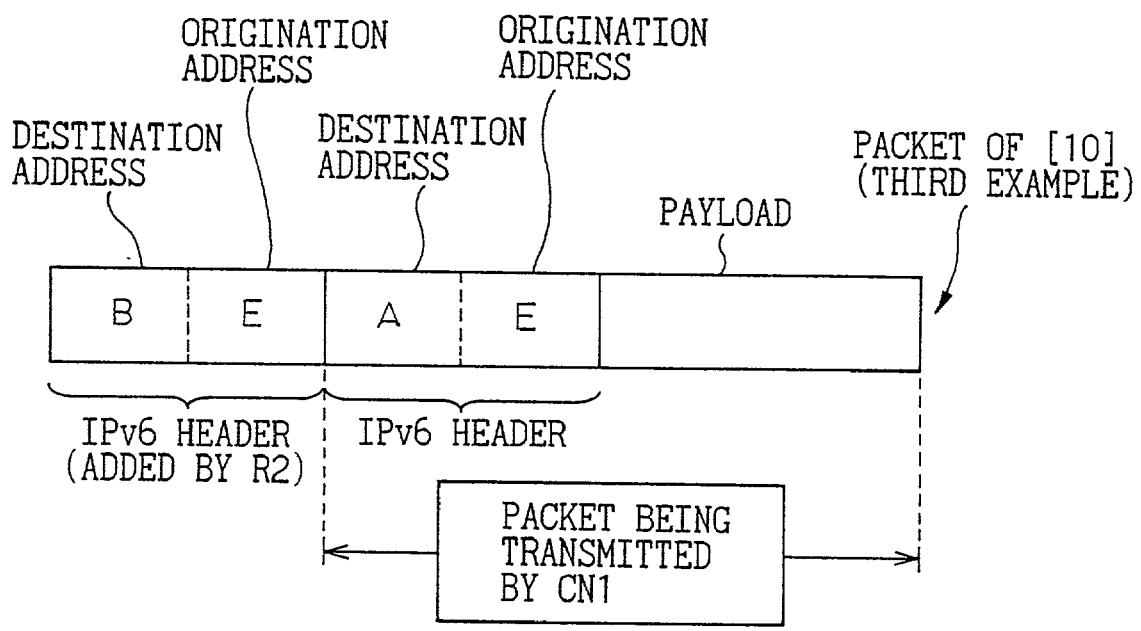
FIG. 20 is a view of the format of a packet transferred at step [10] of FIG. 12 having no authentication header (third example)
Figure 21:
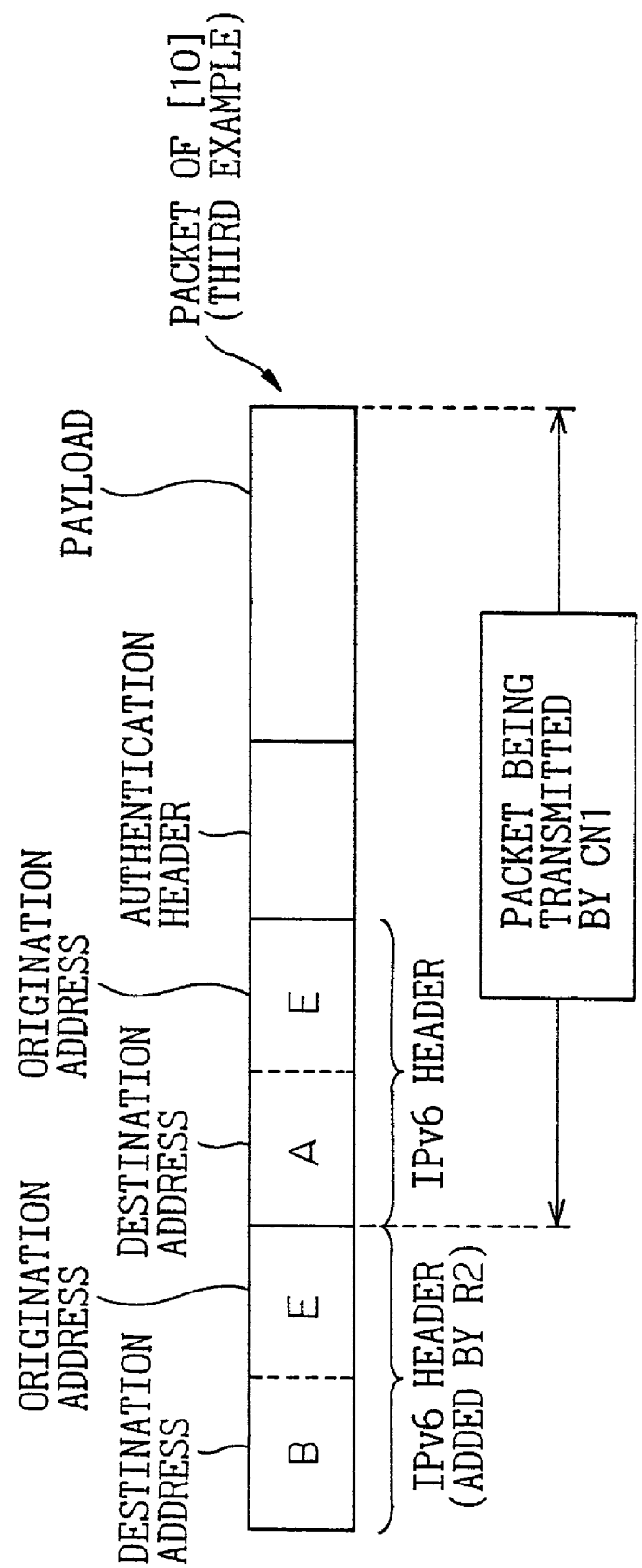
FIG. 21 is a view of the format of a packet transferred at step [10] of FIG. 12 having an authentication header (third example)

For the explanation of this case, refer to FIG. 20 and FIG. 21 in addition to FIG. 12.

FIG. 20 is a view of the format of a packet transferred at step [10] of FIG. 12 having no authentication header (third example); while FIG. 21 is a view of the format of a packet of FIG. 20 but having an authentication header.

In more detail, FIG. 20 shows a packet in the case of IP-in-IP encapsulation and having no authentication header, while FIG. 21 shows a packet in the case of IP-in-IP encapsulation and having an authentication header.

Referring to FIG. 12 and to FIG. 20 and FIG. 21, 2-a) When a packet received by the correspondent node CN1 does not include an authentication header such as in the above-mentioned FIG. 16, the packet transferred from the transfer means 12 of the mobile node adapted router R2 (FIG. 7) to the CoA of the mobile node MN (=address B) becomes as shown in FIG. 20.

The packet of FIG. 20 is comprised of the packet of FIG. 16 plus an IPv6 header (destination address=B, origination address=E) newly added by the transfer means 12.

2-b) When a packet received by the correspondent node CN1 includes an authentication header such as in FIG. 18, the packet transferred from the transfer means 12 of the mobile node adapted router R2 to the CoA of the mobile node (=address B) becomes as shown in FIG. 21.

The packet of FIG. 21, in the same way as 2-a), becomes the packet of FIG. 18 plus an IPv6 header (destination address=B, origination address=E) newly added by the transfer means 12. In this case, the recalculation (FIG. 19) of the authentication data in the authentication header such as performed in the above 1-b) is unnecessary. This is because there is no change in the content of the packet by the mobile node adapted router R2.

Here, the reason for making the origination address of the IPv6 header newly added by the mobile node adapted router R2 the address (=E) of the correspondent node CN1 originating the original packet [9] will be explained below.

According to the Mobile-IPv6 protocol, it is defined that when the mobile node receives an IP-in-IP encapsulated packet, the mobile node determines the compliance of the packet, and if compliant, a binding update is transmitted to the origin of the IP-in-IP encapsulated original packet. Normally, the home agent router intercepts a packet transmitted from the correspondent node CN1 not yet knowing the CoA of the mobile node to the home address of the mobile node (=A), IP-in-IP encapsulates the packet, and transfers this to the mobile node. The mobile node receiving the encapsulated packet transmits a binding update to the correspondent node. This operation is based on the above definition.

When transferring a packet from the mobile node adapted router R2 to the mobile node as in step [10] in FIG. 12 based on the above definition, as shown by the above 2-a) and 2-b), if using an IP-in-IP encapsulated packet, a binding update is transmitted from the mobile node to the correspondent node CN1 each time receiving this IP-in-IP encapsulated packet. In this case, in particular when packets are transmitted continuously, the binding update also ends up being transmitted continuously. This problem can be solved by deliberately making the packet noncompliant in the determination of compliance when receiving an IP-in-IP encapsulated packet in the above mobile node.

That is, one of the conditions for decision of compliance of the mobile node is the condition that "the origination address of the IPv6 header of the original packet and the origination address of the IP-in-IP encapsulated IPv6 header differ" (see document [3] 10.8. Sending Binding Updates to Correspondent Nodes). When using an IP-in-IP encapsulated packet when transmitting a packet from the mobile node adapted router R2 to the mobile node utilizing this in reverse, as shown in FIG. 21, the origination address in the header of the IP-in-IP encapsulated packet ends up being deliberately made the address of the correspondent node CN1 (=E) the same as the origination address of the original packet. In this case, since the condition for decision of compliance is no longer satisfied in the mobile node, the problem of continuously transmitting the binding update disappears. For only the initial packet, to start the registering means 13 of the mobile node adapted router R2 (FIG. 7), it is necessary to transmit the binding update to the mobile node adapted router R2. Various means for this may be considered. One of these will be explained later with reference to FIG. 39.

Summarizing the above with reference to FIG. 7, the transfer means 12 forms the IPv6 routing header (FIG. 17 and FIG. 19) describing the home address (=A) in the packet when transferring a packet from the correspondent node to the mobile node.

Further, the transfer means 12 IP-in-IP encapsulates the packet by the IPv6 header including the current address (CoA) (FIG. 20 and FIG. 21) and transfers it when transferring a packet from the correspondent node to the mobile node.

Figure 22:
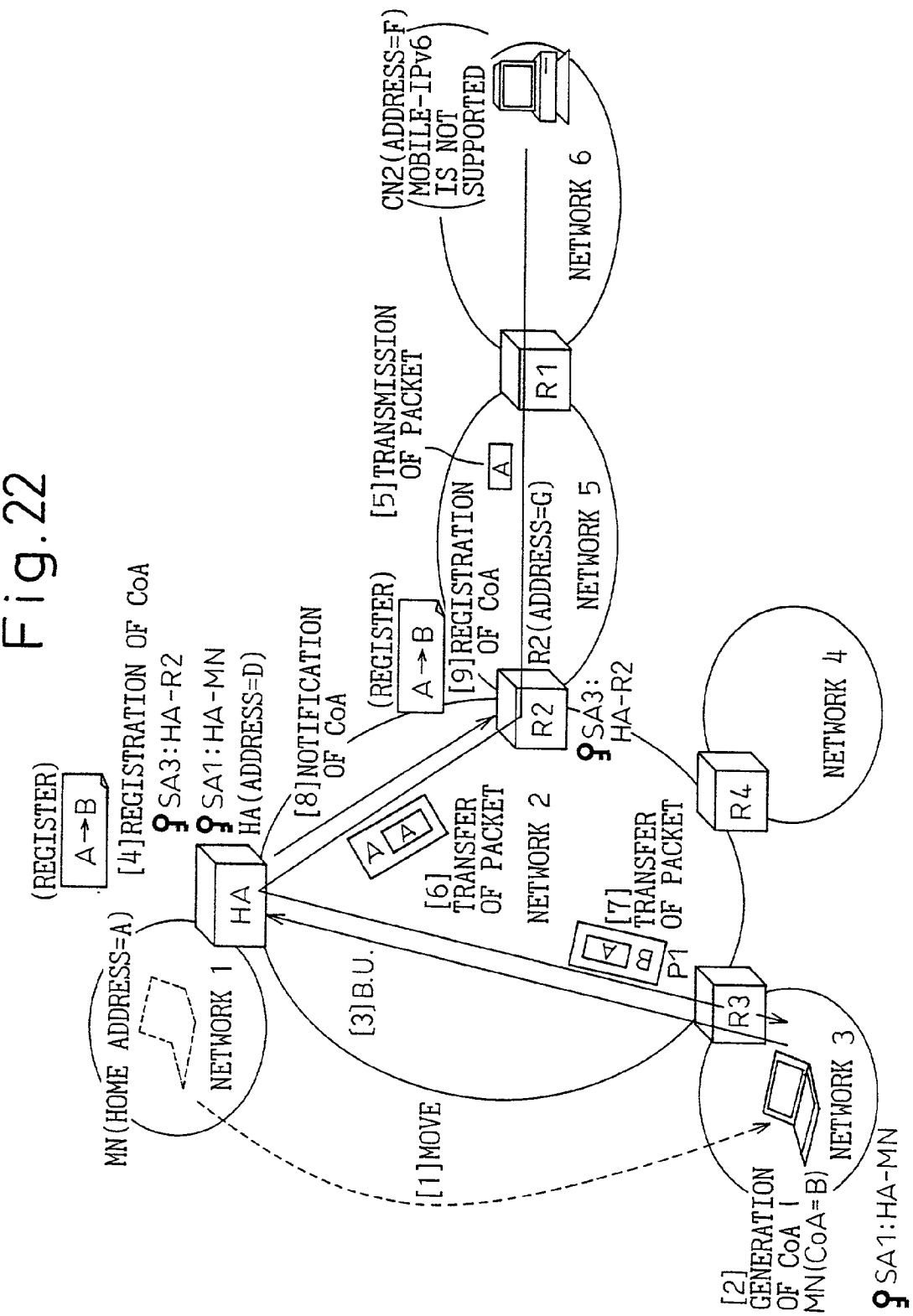
FIG. 22 is a view of a second detailed example of the system of FIG. 9 and FIG. 10.

FIG. 22 is a view of a second detailed example of the system of FIG. 9 and FIG. 10.

The first detailed example explained above (FIG. 11 and FIG. 12) stressed the mobile node adapted router (R2) according to the present invention. The second detailed example (FIG. 22) stresses the home agent router (HA) 20 according to the present invention.

First, an explanation will be given of the home agent router 20 and the mobile node adapted router R2 and nodes (mobile node and correspondent node CN2) shown in FIG. 22 upon which the invention is predicated.

<Mobile Node>

This is the same as the first detailed example (FIG. 11 and FIG. 12). The mobile node and the correspondent node CN2 do not however have authentication information between them (corresponding to the above-mentioned SA2).

<Home Agent Router 20>

This is a home agent router having a function based on the present invention in addition to the ordinary Mobile-IPv6 functions shown in the first detailed example. In this example, the home agent router is assumed to have authentication information SA3 with the mobile node adapted router R2.

<Correspondent Node CN2>

The correspondent node CN2 is a correspondent node communicating with the mobile node, but does not support the Mobile-IPv6 protocol. In this example, the address of the correspondent node CN2 is made F. When transmitting a packet to the mobile node, the packet is transferred normally using the destination address as the home address of the mobile node (=A).

<Routers R1, R3, and R4>

These are ordinary IPv6 routers.

<Router R2>

This is a router having the above function based on the present invention in addition to the functions of a normal IPv6 router. In this example, the address of the mobile node adapted router R2 is made G. Further, assume that the mobile node adapted router R2 does not have authentication information SA2 with the correspondent node CN1 shown in the first detailed example, but has authentication information SA3 with the home agent router 20.

Next, the operation of the system of FIG. 22 will be summarized.

Steps [1] to [4]: These steps are the same as steps [1] to [4] of the first detailed example (FIG. 11).

Step [5]: The correspondent node CN2 transmits a packet to the mobile node. Here, the correspondent node CN2 does not support Mobile-IPv6, so the packet is always transmitted to the home address of the mobile node (=A).

The operation up to step [5] is a normal operation based on the IPv6 and Mobile-IPv6 protocol.

Step [6]: When the mobile node adapted router R2 receives the packet transmitted at step [5], the registering means 13 of the mobile node adapted router R2 (FIG. 17) checks the destination address (=A) of the received packet.

When not storing the binding cache for the destination address (=A), the mobile node adapted router R2 IP-in-IP encapsulates the packet and transfers it to the home agent router. The content of the packet at this time is shown in the figure.

Figure 23:
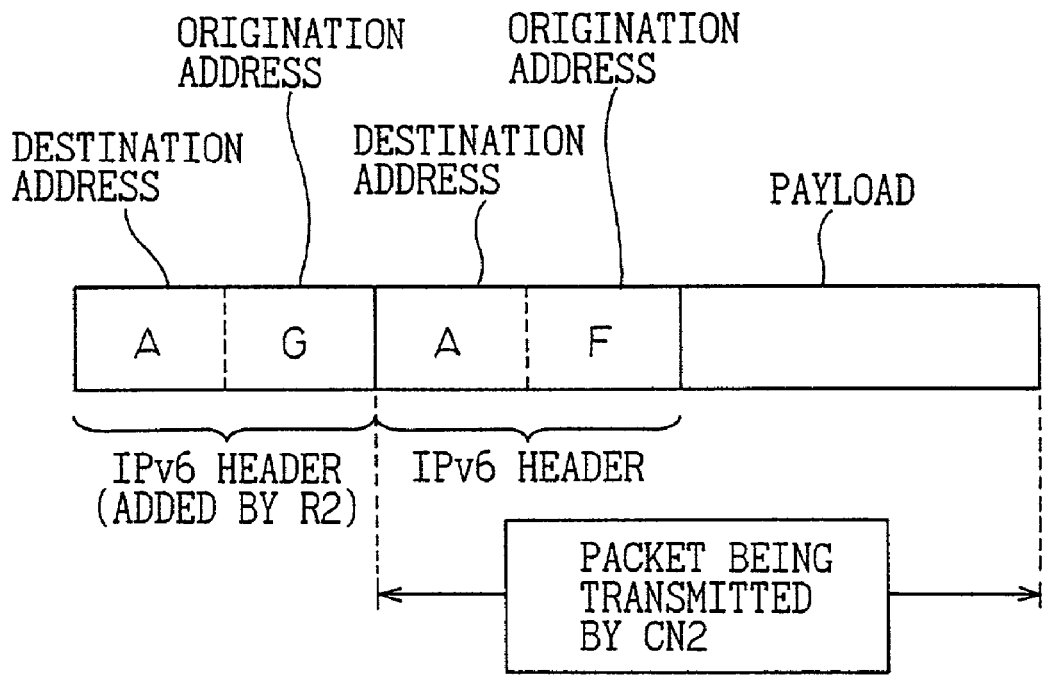
FIG. 23 is a view of the format of a packet transferred at step [6] of FIG. 22.

FIG. 23 is a view of the format of the packet transferred at step [6] in FIG. 22.

The packet [6] becomes the packet transmitted by the correspondent node CN2 plus another new IPv6 packet header (destination address=A, address of originating mobile node adapted router R2=G).

Step [7]: The packet transferred from the mobile node adapted router R2 at step [6] is received by the home agent router 20. In this home agent router, the registering means 23 (FIG. 8) checks the received packet. That is, the home agent router detects that the packet is IP-in-IP encapsulated.

Next, it checks the original packet contained inside of the outside IPv6 packet header shown in FIG. 23 added at step [6] (packet transmitted from correspondent node CN2 at step [5]) and detects the home address (=A) of the destination mobile node.

Next, the home agent router 20 checks the existence of a binding cache for the mobile node and its validity by the registering means 23. When the check reveals that there is a binding cache for the mobile node and it is valid, the home agent router reencapsulates the original packet addressed to the CoA of the mobile node (=address B) and transfers it. The content of the packet at that time is shown in the figure.

Figure 24:
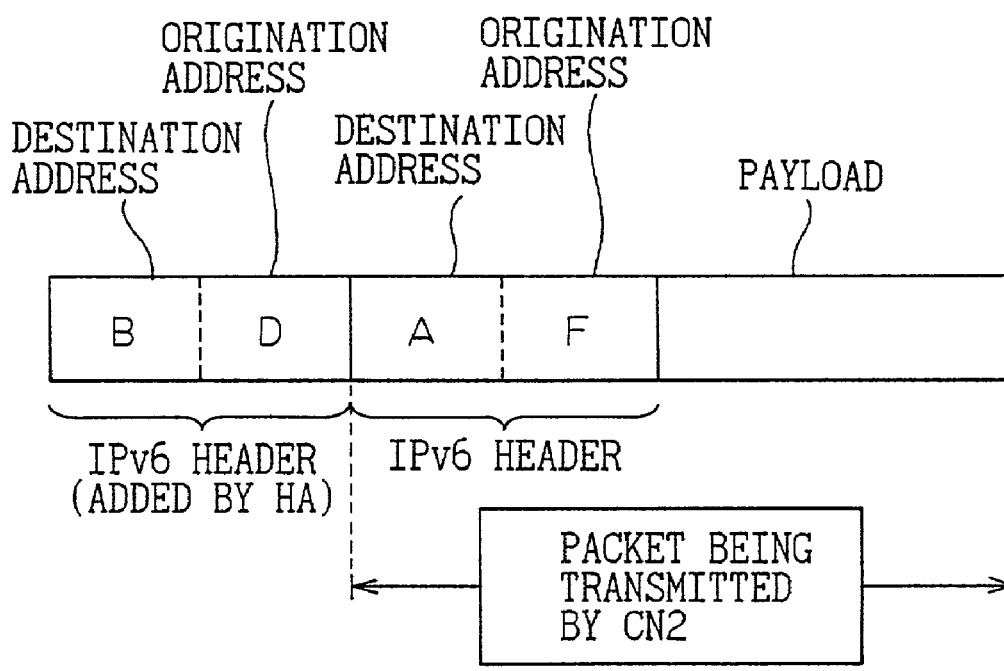
FIG. 24 is a view of the format of a packet transferred at step [7] of FIG. 22.

FIG. 24 is a view of the format of a packet transferred at step [7] in FIG. 22.

The home agent router adds another IPv6 header (destination address=B, address of originating home agent router=D) to the original packet [5] (destination address=A, origination address=F) transmitted by the correspondent node CN2.

Step [8]: Further, the home agent router 20 checks the origination address (G) contained in the outside IPv6 packet header of the packet shown in FIG. 23 received at step [6] and notifies the CoA of the mobile node (=address B) by the address update notifying means 22 (FIG. 8) to the mobile node adapted router R2 originating the IP-in-IP encapsulated packet (=address G).

The notification is a procedure independent of the Mobile-IPv6 protocol, so any means may be used to notify the CoA to the mobile node adapted router R2. In this example, it is assumed that it is notified using the binding update of the Mobile-IPv6. The content of the packet at this time is shown in the figure.

Figure 25:
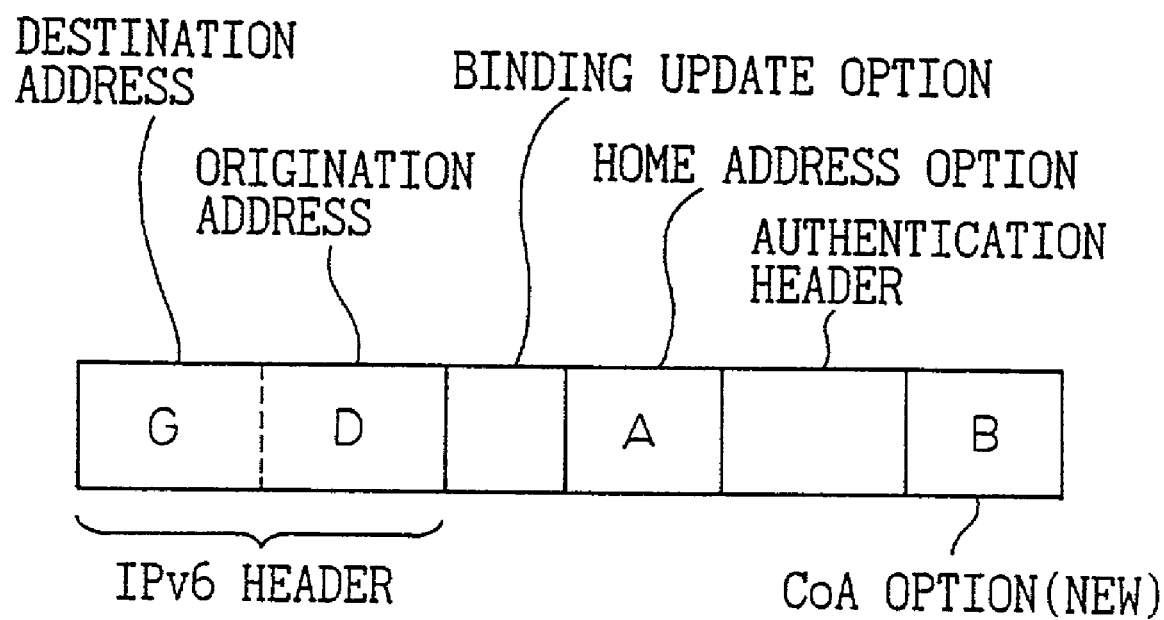
FIG. 25 is a view of the format of a packet transferred at step [8] of FIG. 22.

FIG. 25 is a view of the format of the packet transferred at step [8] in FIG. 22. That is, it shows the content of the packet notifying the CoA from the home agent router 20 to the mobile node adapted router R2.

As shown in the figure, the notification packet becomes an IPv6 header (destination address=G, origination address=D) plus a binding update option, home address option, authentication header, and COA option. The binding update option, the home address option, and the authentication header are similar to those shown at step [6] of the first detailed example (FIG. 11) and are defined by the Mobile-IPv6 and IPSec.

The authentication data included in the authentication header is calculated by using the authentication information SA3 between the home agent router 20 and the mobile node adapted router R2 and the content of the packet.

Further, the CoA option is not defined in the Mobile-IPv6, so can be defined as a new option. The content of the new option is shown in the figure.

Figure 26:
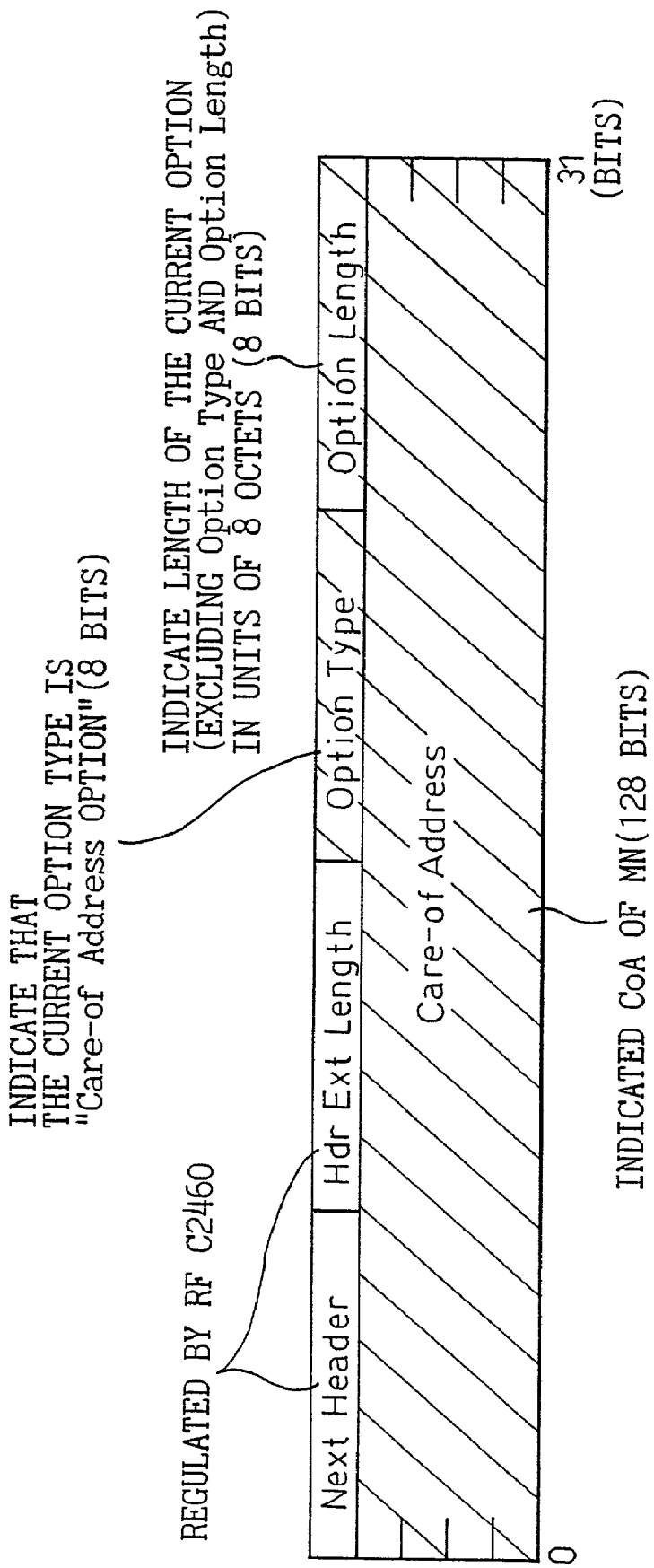
FIG. 26 is a view of an example of the format of a CoA option in FIG. 25.

FIG. 26 is a view of an example of the format of the CoA option in FIG. 25.

In this figure, the CoA option, like the binding update option, is processed by the registering means 13 (FIG. 7) of the receiving side node (here, the router R2) shown by the destination address of the IPv header (FIG. 25) as a destination option header as a IPv6 extension header.

In the example of the format of FIG. 26, a numeral, indicating that the option is a CoA address, is written as the option type (8 bits). A numeral, indicating the length of the option (excluding the option type and the option length), is written in the option length (8 bits) in 8-octet units. The CoA of the mobile node to be notified (here, the address B) is written in the care-of address (128 bits).

Step [9]: Returning to FIG. 22, the mobile node adapted router R2 receives the CoA notification packet transmitted from the home agent router 20 at step [8] at the receiving means 13 (FIG. 7). The mobile node adapted router R2 checks the content of the received packet by the registering means (FIG. 7). First, when detecting the inclusion of the binding update option, it judges that the packet is a CoA notification packet.

Next, it judges that (i) the destination address of the IPv6 header (FIG. 25) is its own address (=G), (ii) the origination address is the address of the home agent router (D), and (iii) the packet was transmitted from the home agent router to itself (R2).

Next, it checks the authentication header (FIG. 25) based on the authentication information SA3 with the home agent router. When succeeding in checking the authentication header, it stores the home address of the mobile node (=A) obtained from the home address option included in the packet (FIG. 25), the CoA of the mobile node (=address B) obtained from the CoA option, the validity included in the binding update option, and other information in the memory means 11 (FIG. 7) as a binding cache.

Here, since the CoA option (FIG. 25 and FIG. 26) are included, the CoA of the mobile node is not obtained from the origination address of the IPv6 header (=D). Instead, the CoA is obtained from the CoA option (=address B). The authentication header of FIG. 25 adjoining the CoA option is calculated using the authentication information SA established between origination address of the packet (in a Mobile IPv6 message, the address stored in the home address option) and the origin at both the transmission and reception sides. When the home agent router notifies the CoA of the mobile node to the mobile node adapted router R2, even if trying to notify a packet based on the usual binding update message format of the Mobile-IPv6, by for example, [F], [B], [BU], [A], or [authentication], since there is no authentication information SA between the correspondent node and mobile node originally, the home agent router cannot calculate and impart the authentication header.

Therefore, by forming a packet as shown in FIG. 25 and establishing authentication information SA3 between the home agent router and the mobile node adapted router R2, it becomes possible to calculate the authentication header between the home agent router and mobile node adapted router R2 and check the notification packet at the home agent router and mobile node adapted router R2.

By the above operation, a binding cache is generated for the mobile node at the mobile node adapted router R2. Thereafter packets transmitted from the correspondent node CN2 to the mobile node are transferred by the route of CN2→R1→R2→R3→MN without going through the home agent router in the same way as [10] of the first detailed example (FIG. 12).

In the second detailed example (FIG. 22), it is assumed that the correspondent node CN2 does not hold authentication information for the mobile node, so there is no authentication header included in the packet transmitted from the correspondent node CN2 to the mobile node. In this case, the packet is transferred by the method of 1-a) or 2-a) shown in step [10] in the first detailed example.

If assuming that the correspondent node CN2 holds authentication information for the mobile node, an authentication header is included in the packet transmitted from the correspondent node CN2 to the mobile node. When an authentication header is included in this way, the packet is transferred by the method of 1-b) or 2-b) shown in step [10] in the first detailed example.

Further, in the same way as the above step [6] in the first detailed example, the binding update is transmitted from the mobile node to the correspondent node CN2. In this case, in the same way as steps [7] to [10] in the first detailed example, the mobile node adapted router R2 receives the binding update addressed to the correspondent node CN2 and transfers the packet directly from the mobile node adapted router R2 to the CoA of the mobile node.

The above point will be summarized below with reference to FIG. 8.

When the other router (R2) cooperating with the home agent router is a mobile node adapted router able to communicate with the mobile node supporting the Mobile-IPv6 protocol, the address update notifying means 22 (FIG. 8) notifies the CoA showing the current address to the mobile node adapted router (R2) as a destination option (FIG. 25 and FIG. 26) as an IPv6 extension header.

The authentication header (FIG. 25) is included in the packet [8] (FIG. 2) notified to this mobile node adapted router (R2), and the authentication data in the authentication header is comprised of the results of calculation obtained by calculation using the authentication information SA3 set between the home agent router and the mobile node adapted router (R2) and the content of the packet.

Finally, a supplementary explanation will be given of the detailed examples of the mobile node adapted router (R2) 10 and home agent router 20 according to the present invention.

The routers 10 and 20 shown in FIG. 7 and FIG. 8 can be realized by software, but the explanation will be given below for the case where they are configured by functional blocks.

First, for convenience in explanation, the first detailed example of the above system (FIG. 11 and FIG. 12) and the second detailed example (FIG. 22) will be reexpressed combined into one.

Figure 27:
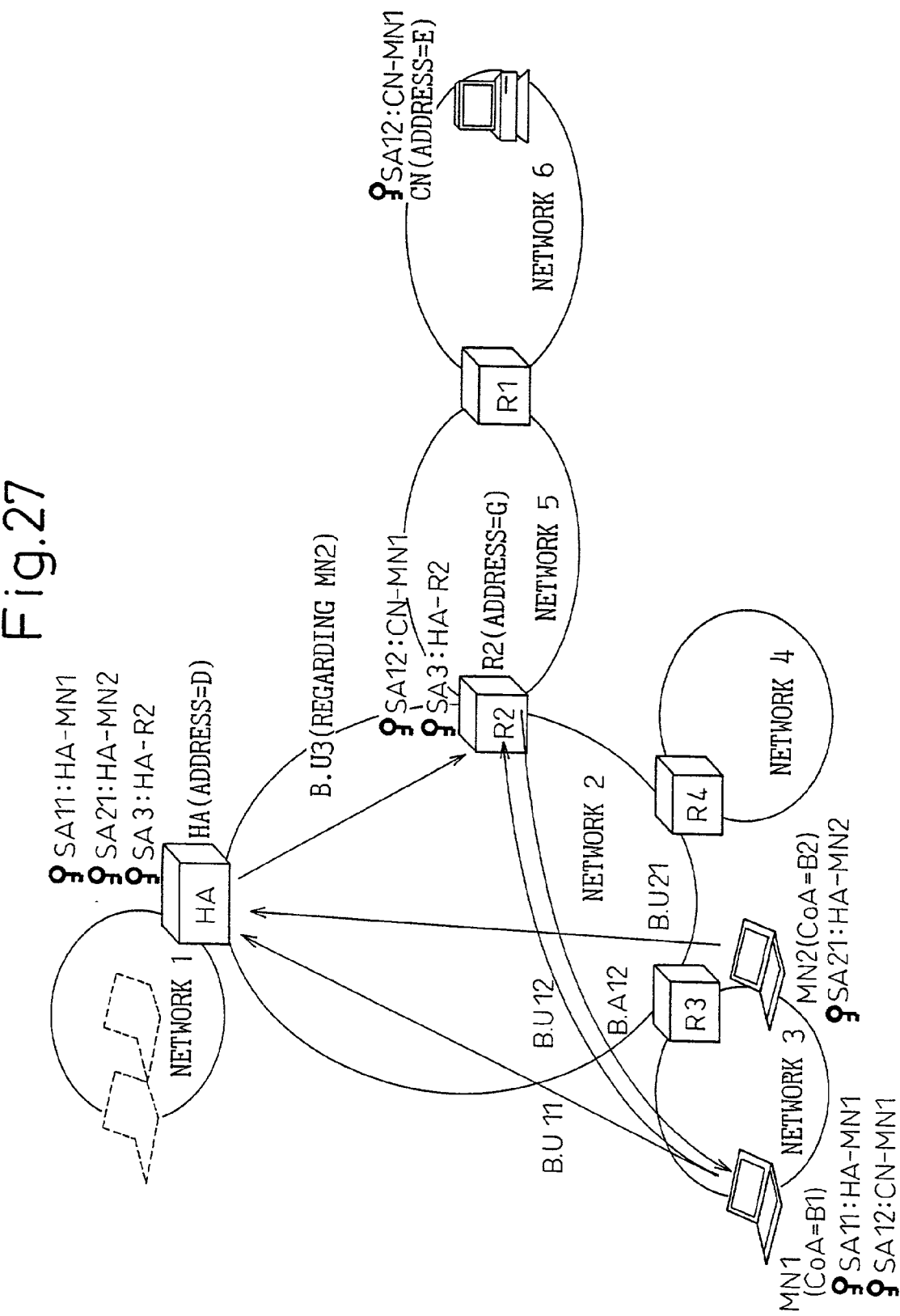
FIG. 27 is a view of the system shown in FIGS. 11, 12, and 22 combined.

FIG. 27 is a view of the systems of FIGS. 11, 12, and 22 combined.

In the figure, the mobile node MN1 (home address=A1) corresponds to the mobile node of FIG. 11 and FIG. 12, while the mobile node MN2 (home address=A2) corresponds to the mobile node of FIG. 22. Therefore, the home address and security information are also redefined. The content of the table appearing in the later given explanation (FIG. 29 and FIG. 30) and the packets and processing route are based on the settings shown in FIG. 27.

In FIG. 27, the mobile node MN1 and the correspondent node have security information SA12 between them, so the mobile node MN1 transmits the binding update (BU) 12 to the correspondent node in addition to the binding update (BU) 11 to the home agent router. Note that the binding update (BU) 12 is received by the mobile node adapted router R2 instead of the correspondent node. A binding acknowledgment (BA) 12 is transmitted from the mobile node adapted router R2 to the mobile node MN1.

Further, the mobile node MN2 and the correspondent node do not have security information between them, so the mobile node MN2 transmits only the binding update (BU) 21 to the home agent router while moving.

Further, the home agent router and mobile node adapted router R2 have the security information SA3 between them. The home agent router transmits the CoA of the mobile node MN2, that is, the binding update (BU) 3, to the mobile node adapted router R2.

Note that the authentication information SA12 of the correspondent node is provided instead by the mobile node adapted router R2, so does not have to be provided at the correspondent node.

Figure 28:
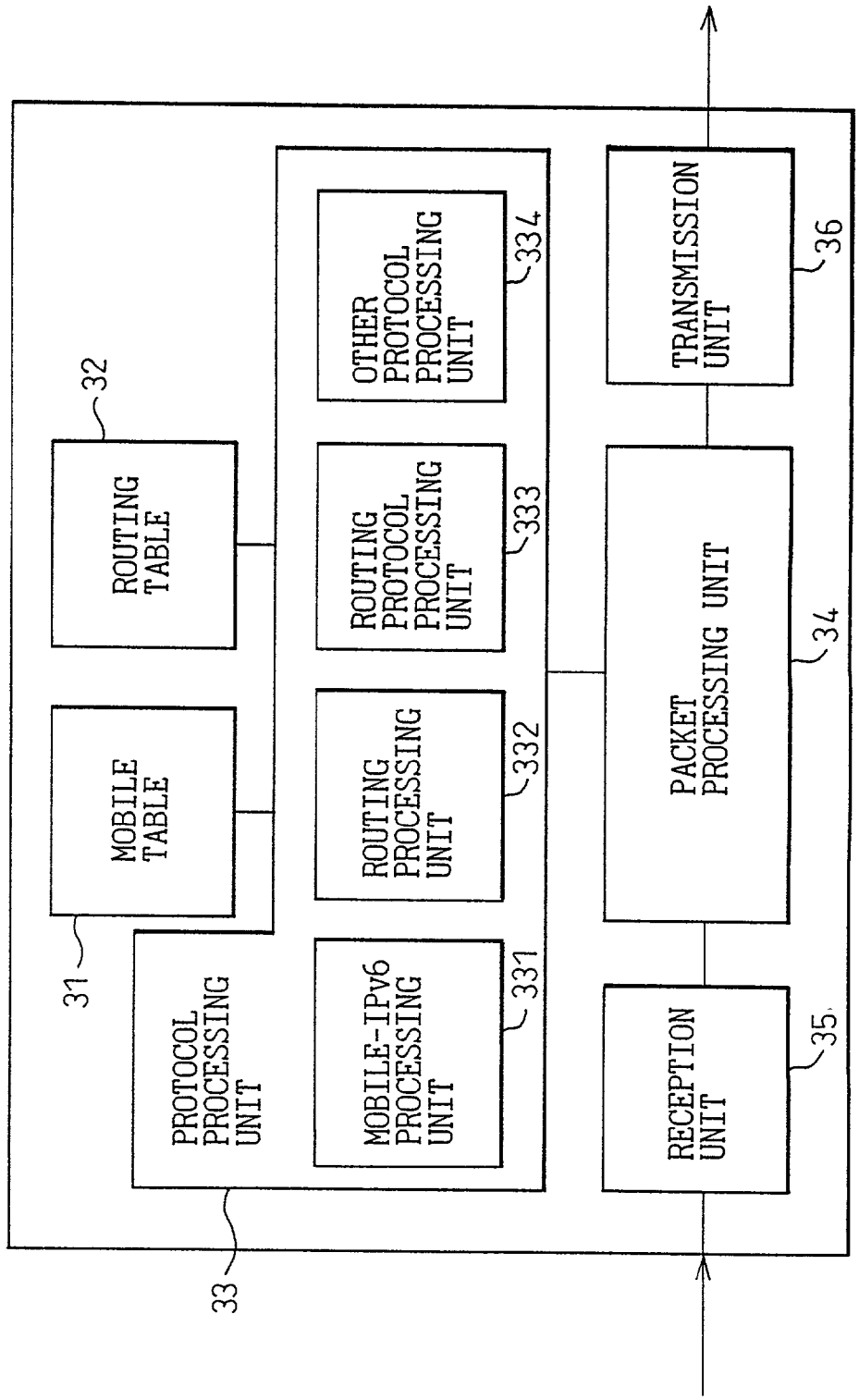
FIG. 28 is a view of functional blocks of the routers (10, 20) according to the present invention.

FIG. 28 is a view of the functional blocks of routers (10, 20) according to the present invention.

As shown in the figure, the router (R2) 10 can also be expressed by functional blocks substantially the same as the router (HA) 20. The content of the table, however, differs by the router 10 and router 20 (explained later). Further, the upstream side processing and downstream side processing of the packets are the same.

The mobile table 31 stores the information necessary for storing the CoA of the mobile node and transferring a packet by an optimized route. Note that examples of the content of the table are shown in FIG. 29 and FIG. 30.

The routing table 32 is the same as a routing table of a normal router. It is a table storing information referred to when deciding the routing of a packet. Note that examples of the content of the table are shown in FIG. 31 and FIG. 32.

The protocol processing means 33, as illustrated, includes a Mobile-IPv6 processing unit 331, a routing processing unit 332, a routing protocol processing unit 333 and another protocol processing unit 334. It interprets the content of a packet in accordance with protocols (Mobile IPv6, ICMP, etc.) and processes the message based on this.

The packet processing unit 34 determines the type of the packet and hands over the protocol processing to the protocol processing means 33. Further, the processing unit corrects and generates a packet and inputs it to the transmission unit based on an instruction from the protocol processing means 33.

The reception unit 35 receives a signal from a transmission path forming the network, assembles the frames, and checks the normality of the data.

The transmission unit 36 places the transmission packet from the packet processing unit 34 on a transmission frame and sends it over the above transmission path.

FIG. 29 is a view of an example of the content of a mobile table for a router (R2) 10.

The mobile table 31 of FIG. 28 stores this content for the router (R2) 10.

Note that the CoA of the mobile node MN is erased when the validity runs out. Further, in practice, information for a plurality of mobile nodes may be stored for a single correspondent node.

Looking at the mobile table-mobile node information, this information is notified from the home agent router and cached. When the validity runs out, all entries of the mobile node home address, CoA, and validity are erased.

FIG. 30 is a view of an example of the content of a mobile table for a router (HA) 20.

The mobile table 31 of FIG. 28 stores this content for the router 20.

The mobile table mobile node information is erased when the validity for the CoA of the mobile node runs out.

FIG. 31 is a view of an example of the content of a routing table for a router (R2) 10.

The routing table 32 of FIG. 28 stores this content for the router (R2) 10.

FIG. 32 is a view of an example of the content of a routing table for a router (HA) 20.

The routing table 32 of FIG. 28 stores the content for the router 20.

Figure 33:
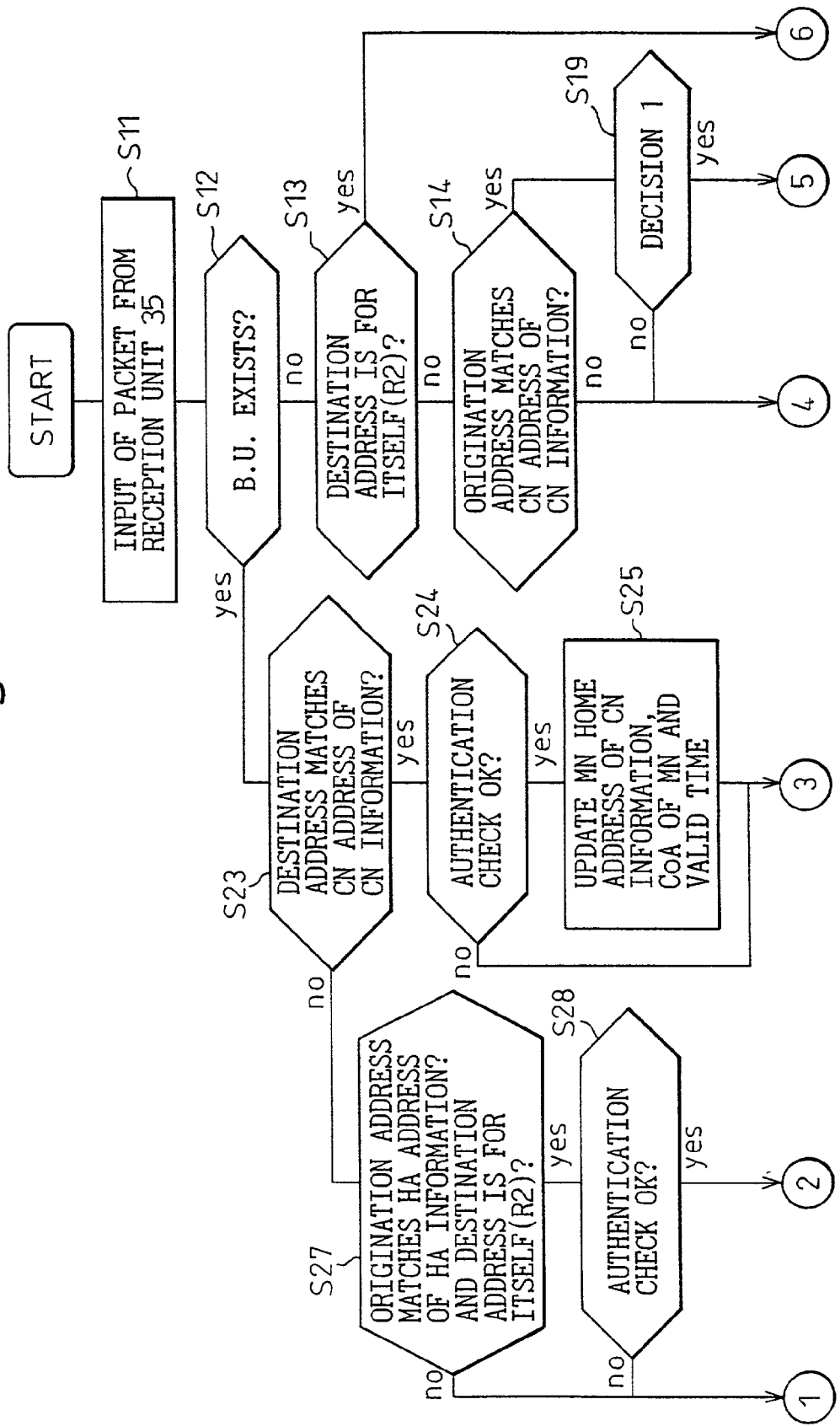
FIG. 33 is a first part of a flow chart of processing of a packet processing unit serving as a router (R2) (FIG. 28)
Figure 34:
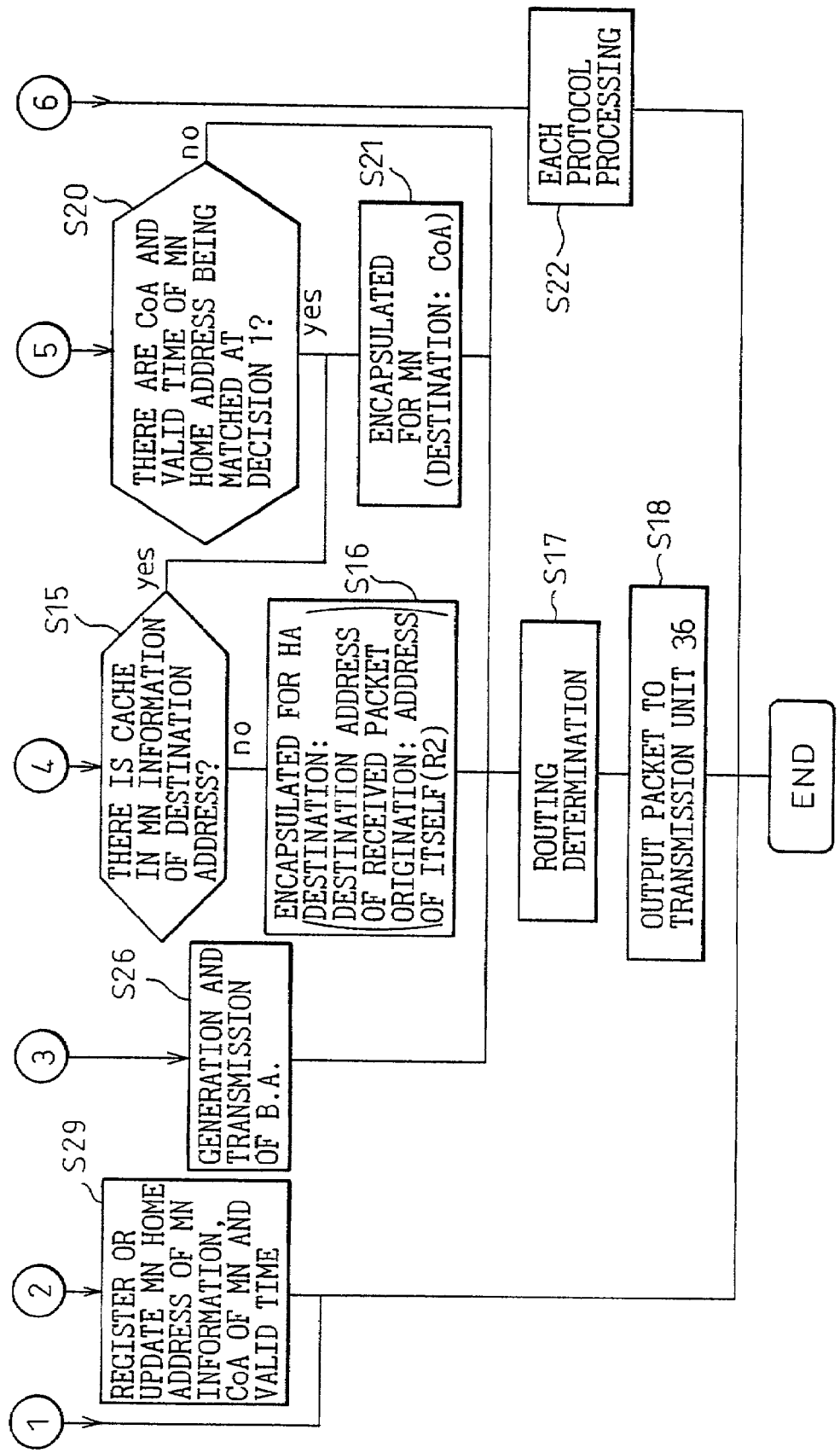
FIG. 34 is a second part of a flow chart of processing of a packet processing unit serving as a router (R2) (FIG. 28)

FIG. 33 is a first part of a flow chart of processing of a packet processing unit 34 serving as a router (R2) (FIG. 28); while FIG. 34 is a second part of the flow chart.

Figure 35:
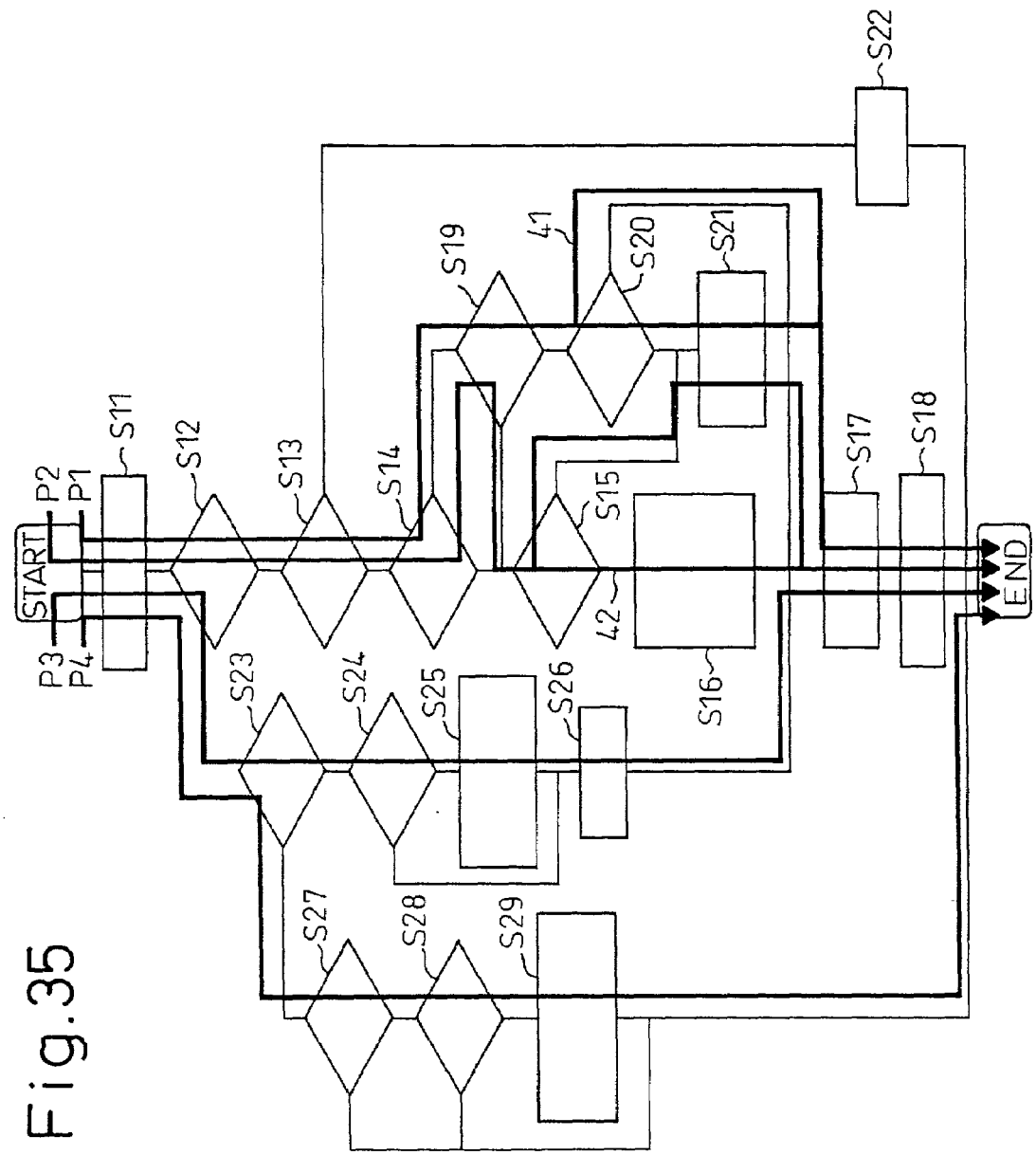
FIG. 35 is a view of the flow of the packets (P1 to P4) in the flow charts of FIG. 33 and FIG. 34.

FIG. 35 is a view of the flow of the packets (Pi to P4) in the flow charts of FIG. 33 and FIG. 34; while FIG. 36 is a view of the format of the packets (P1 to P4) in FIG. 35.

Further explaining FIG. 33, the "decision 1" of step S19 decides for a CN address matching at the previous decision if the mobile node home address of the correspondent node information and the destination address of the received packet match.

Further explaining FIG. 35, along the route 41, when there is no CoA of the mobile node MN1, the received packet is transmitted to the home agent router as it is. The home agent router performs the processing of the packet P5 shown in FIG. 39.

Further, along the route 42 of FIG. 35, when there is no COA of the mobile node MN2, the received packet is encapsulated and transmitted to the home agent router. The home agent router performs the processing of the packet P6 shown in FIG. 39.

Figure 37:
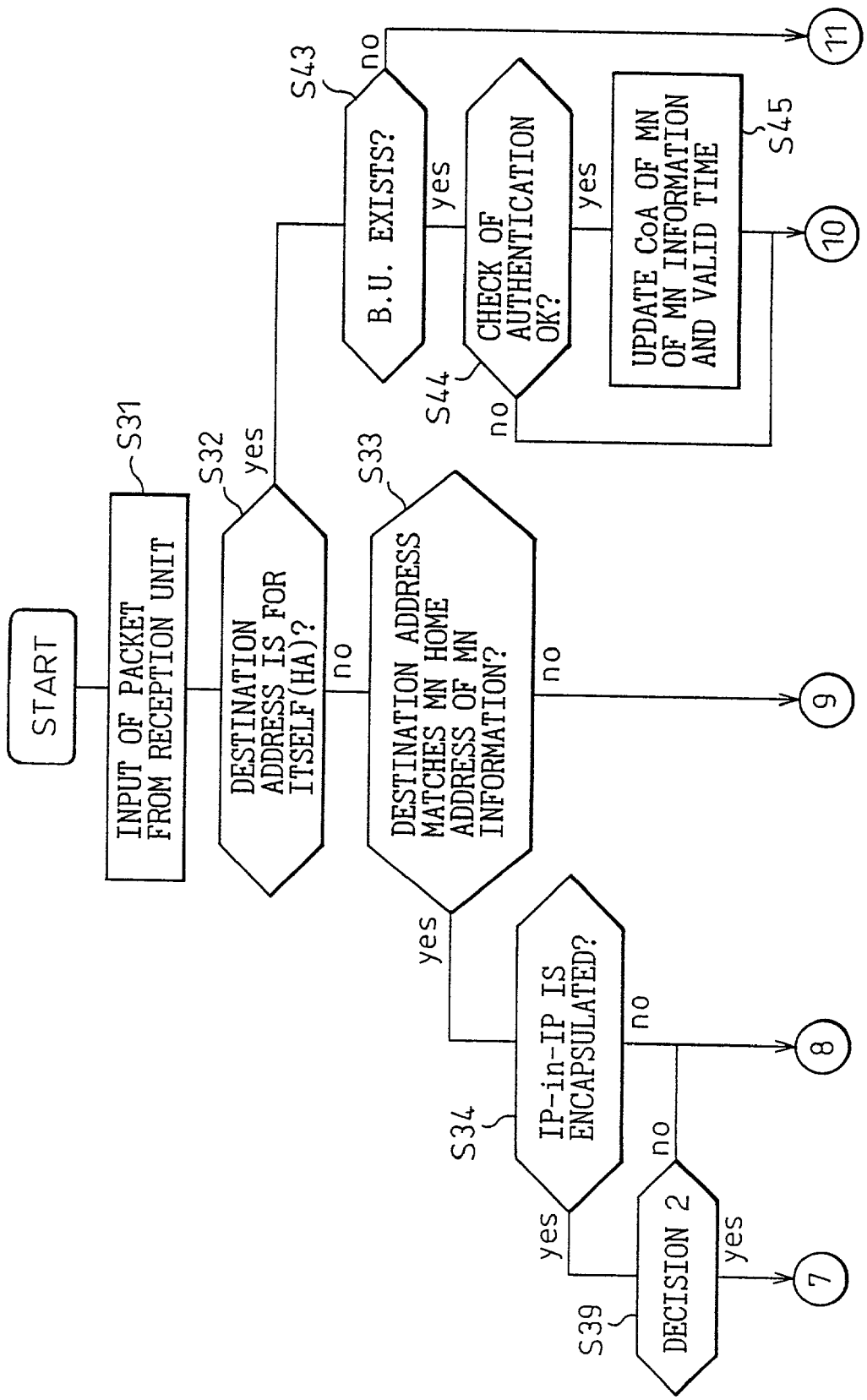
FIG. 37 is a first part of a flow chart of processing of a packet processing unit serving as a router (HA) (FIG. 28)
Figure 38:
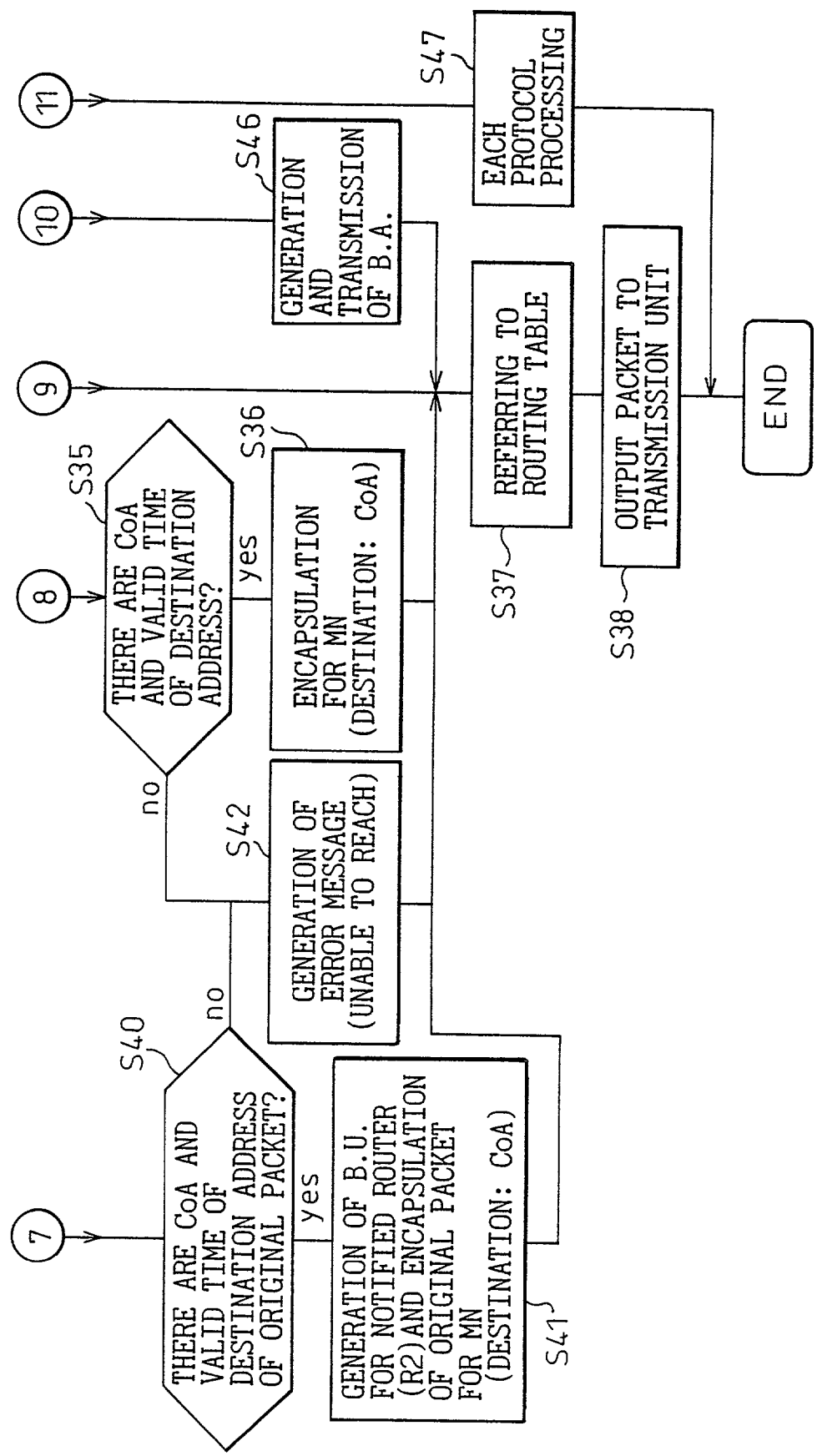
FIG. 38 is a second part of a flow chart of processing of a packet processing unit serving as a router (HA) (FIG. 28)
Figure 39:
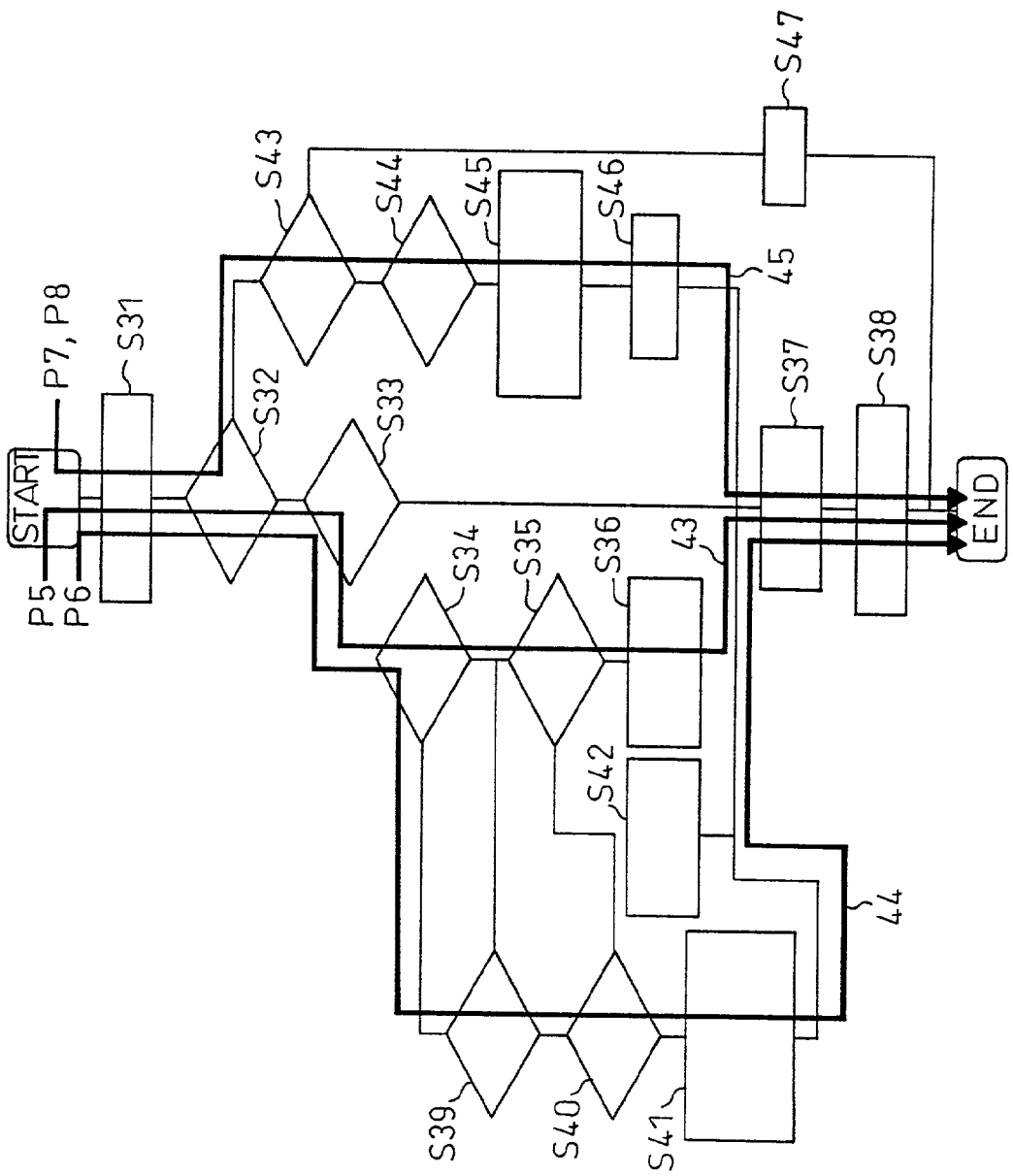
FIG. 39 is a view of the flow of the packets (P5 to P8) in the flow charts of FIG. 37 and FIG. 38.

FIG. 37 is a first part of a flow chart of processing of a packet processing unit 34 serving as a router (HA) (FIG. 28); FIG. 38 is a second part of the flow chart; FIG. 39 is a view of the flow of the packets (P5 to P8) in the flow charts of FIG. 37 and FIG. 38; and FIG. 40 is a view of the format of the packets (P5 to P8) in FIG. 39.

Further explaining FIG. 37, the "decision 2" at step S39 decides if the origination address matches the router address of the destination router information and if the destination address of the encapsulated header (outside) and the destination address of the original header (inside) match.

Further explaining FIG. 39, when the mobile node MN1 receives a packet encapsulated and transferred addressed to the CoA of the mobile node MN1 by the home agent router along the route 43, the mobile node MN1 transmits the binding update (BU) 12 to the correspondent node.

Further, along the route 44, the home agent router transfers the packet P2 of FIG. 35 to the CoA of the mobile node MN2 and transmits the packet P4 of FIG. 35 to the mobile node adapted router R2.

Further, along the route 45, the home agent router receives the binding update from the mobile node MN1 and the mobile node MN2 and returns the binding acknowledgment. This is a normal registration operation.

Above, a detailed explanation was given of the routers 10 and 20. Assume however that, at the end of 2-b) in it, "the problem of continuous transmission of the binding update disappears if the condition for decision of compliance is no longer satisfied at the mobile node". For just the first packet, however, to start the registering means 13 (FIG. 17), it is necessary to devise some means for transmitting the binding update to the mobile node adapted router R2. It was stated that this would be explained later with reference to FIG. 39. This will be explained next.

The first packet from the correspondent node to the mobile node is sent to the home address of the mobile node in the form of the packet P5 or P6 of FIG. 39 since the CoA is not stored at the mobile node adapted router R2. The home agent router receives this packet, encapsulates this as shown in FIG. 13, and transmits it from the home agent router to the mobile node. At this time, the origination address of the outside header of the encapsulated packet is the address of the home agent router. This differs from the case where the mobile node adapted router R2 IP-in-IP encapsulates the packet shown in FIG. 20 or FIG. 21. When the mobile node is the above-mentioned mobile node MN1, that is, a mobile node having security information with the correspondent node, and an encapsulated packet is received through the home agent router, it is possible to transmit a binding update to the correspondent node since the condition for decision of the compliance described at 2-b) is satisfied.

The URLs of the documents mentioned in this specification are as follows:

Document [1] (mobile IP):
http://www.ietf.org/rfc/rfc2002.txt

Document [2] (IPv6):
http://www.ietf.org/rfc/rfc2460.txt

Document [3] (mobile IPv6):
http://www.ietf.org/internet-drafts/draft-ietf-mobileip-ipv6-12.txt Document [4] (authentication header):
http://www.ietf.org/rfc/rfc2402.txt Summarizing the effect of the invention, as explained above in detail, the present invention can shorten the time required for updating the CoA accompanying movement of a mobile node and increases the speed of switching of the packet transfer route.

Further, it is possible to optimize the packet transfer route from a correspondent node not supporting a mobile-IPv6 to a mobile node without going through a home agent router.

Due to this, it becomes possible to prevent an increase in the packet transfer delay and packet loss causing a deterioration in the quality of service.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2000-377628, filed on Dec. 12, 2000, the disclosure of which is expressly incorporated herein by reference in its entirety.

What is claimed is:

1. A mobile node adapted router, located on a communication path between a correspondent node communicating with a mobile node and a home agent of the mobile node, and forming a network supporting packet communication for at least a mobile node, comprising:
   a memory means for storing a current address of said mobile node which should be stored by a correspondent node of the packet communication in place of the correspondent node;
   a transfer means for referring to said memory means, converting a home address destination to a current address destination, and transmitting a packet, when receiving a packet transmitted from said correspondent node destined for the home address destination, to the current address destination before the received packet reaches the home agent; and
   a registering means for newly registering correspondence between the home address and the current address in the memory means triggered by the reception of update notifying information transmitted for notifying the correspondent node in communication of updating of an address along with a change of the current address due to movement of the mobile node.

2. A mobile node adapted router as set forth in claim 1, wherein said network includes a home agent router accommodating the mobile node at the home address and the mobile node adapted router further comprises a registering means for newly registering the correspondence between the home address and the current address in the memory means triggered by the transfer of an updated address from the home agent router when receiving update notifying information transmitted for notifying the home agent router of updating of an address along with a change of the current address due to movement of the mobile node.

3. A home agent router, forming a network supporting packet communication for at least a mobile node, comprising:
   a receiving means for receiving update notifying information transmitted for notifying the home agent router of updating of the address along with a change of the current address due to movement of the mobile node and
   an address update notifying means for transmitting the current address after updating to a mobile node adapted router as defined in claim 1, which router forms the network when receiving the update notifying information.

4. A mobile node adapted router as sat forth in claim 1, wherein when the correspondent node is a node supporting the Mobile-IPv6 protocol, the current address is a care-of address and the update notifying information is a binding update signal.

5. A mobile node adapted router as set forth in claim 1, wherein said transfer means holds authentication information set with the mobile node and returns a binding acknowledgment signal for reception of the binding update signal to the mobile node originating the binding update signal.

6. A mobile node adapted router as set forth in claim 1, wherein said transfer means forms an IPv6 routing header describing said home address in said packet when transferring the packet from said correspondent node to said mobile node.

7. A mobile node adapted router as set forth in claim 1, wherein said transfer means IP-in-IP encapsulates and transfers said packet by an IPv6 header including said current address when transferring the packet from said correspondent node to said mobile node.

8. A home agent router as set forth in claim 3, wherein said other router is a mobile node adapted router able to communicate with a mobile node supporting the Mobile-IPv6 protocol and wherein said address update notifying means notifies said mobile node adapted router of a care-of address indicating said current address as a destination option as one of the IPv6 extension headers.

9. A home agent router as set forth in claim 3, wherein a packet notified to said mobile node adapted router includes an authentication header and wherein the authentication data inside said authentication header is comprised of results of calculation using the authentication information set between the home agent router and the mobile node adapted router and the content of the packet.

* * * * *